US012099715B2

(12) United States Patent
Fleizach et al.

(10) Patent No.: US 12,099,715 B2
(45) Date of Patent: *Sep. 24, 2024

(54) SYSTEMS AND METHODS FOR EXPLORING A GEOGRAPHIC REGION

(71) Applicant: Apple Inc., Cupertino, CA (US)

(72) Inventors: Christopher B. Fleizach, Gilroy, CA (US); Michael A. Troute, Stanford, CA (US); Reginald D. Hudson, San Francisco, CA (US); Aaron M. Everitt, Fremont, CA (US); Conor M. Hughes, San Leandro, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,841

(22) Filed: Jan. 30, 2023

(65) Prior Publication Data
US 2023/0315260 A1    Oct. 5, 2023

Related U.S. Application Data

(63) Continuation of application No. 16/460,507, filed on Jul. 2, 2019, now Pat. No. 11,567,632.

(51) Int. Cl.
*G06F 3/04883*   (2022.01)
*G01C 21/34*    (2006.01)
(Continued)

(52) U.S. Cl.
CPC ......... *G06F 3/04883* (2013.01); *G01C 21/34* (2013.01); *G06F 3/167* (2013.01);
(Continued)

(58) Field of Classification Search
CPC .......................... G06F 16/29; G01C 21/3664
See application file for complete search history.

(56) References Cited

U.S. PATENT DOCUMENTS

| 5,311,434 A | 5/1994 | Tamai |
| 5,790,976 A | 8/1998 | Boll et al. |

(Continued)

FOREIGN PATENT DOCUMENTS

| CN | 109000657 A | 12/2018 |
| CN | 109830118 A | 5/2019 |

(Continued)

OTHER PUBLICATIONS

ABRP 3.7 Release Notes, Apple Store Release Notes, Available online at: <https://web.archive.org/web/20191225192637/https://apps.apple.com/us/app/a-better-routeplanner-abrp/id1490860521>, [Retrieved Jul. 19, 2022], Apr. 26, 2019, pp. 1-16.

(Continued)

*Primary Examiner* — Asher D Kells
(74) *Attorney, Agent, or Firm* — Kubota & Basol LLP

(57) ABSTRACT

The present disclosure generally relates to exploring a geographic region that is displayed in computer user interfaces. In some embodiments, a method includes at an electronic device with a display and one or more input devices, displaying a map of a geographic region on the display and detecting a first user input to select a starting location on the map. After detecting the first user input, the method includes detecting a second user input to select a first direction of navigation from the starting location. In response to detecting the second user input, the method includes determining a path on the map that traverses in the first direction of navigation and connects the starting location to an ending location, and providing audio that includes traversal information about traversing along the path in the geographic region in the first direction of navigation and from the starting location to the ending location.

51 Claims, 30 Drawing Sheets

Related U.S. Application Data

(60) Provisional application No. 62/693,812, filed on Jul. 3, 2018.

(51) Int. Cl.
  *G06F 3/0482* (2013.01)
  *G06F 3/0486* (2013.01)
  *G06F 3/16* (2006.01)
  *G06F 16/29* (2019.01)

(52) U.S. Cl.
  CPC ............ *G06F 16/29* (2019.01); *G06F 3/0482* (2013.01); *G06F 3/0486* (2013.01)

(56) References Cited

U.S. PATENT DOCUMENTS

| | | |
|---|---|---|
| 5,857,066 A | 1/1999 | Wyche et al. |
| 5,948,040 A | 9/1999 | Delorme et al. |
| 6,181,991 B1 | 1/2001 | Kondo et al. |
| 6,188,957 B1 | 2/2001 | Bechtolsheim et al. |
| 6,323,846 B1 | 11/2001 | Westerman et al. |
| 6,340,936 B1 | 1/2002 | Mcgaffey et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,212,924 B1 | 12/2015 | Salowitz |
| 9,348,458 B2 | 5/2016 | Hotelling et al. |
| 9,417,933 B2 | 8/2016 | Narayanan et al. |
| 9,933,937 B2 | 4/2018 | Lemay et al. |
| 10,169,794 B2 | 1/2019 | Aziz et al. |
| 10,184,800 B2 | 1/2019 | Fowe et al. |
| 10,360,518 B2 | 7/2019 | Hirose et al. |
| 10,371,536 B2 | 8/2019 | König et al. |
| 10,424,195 B2 | 9/2019 | Kim et al. |
| 10,488,215 B2 | 11/2019 | Yu |
| 10,699,347 B1 | 6/2020 | Slusar et al. |
| 10,760,917 B2 | 9/2020 | Moore et al. |
| 11,015,952 B1 | 5/2021 | Lyle et al. |
| 11,092,459 B2 | 8/2021 | Hoffman et al. |
| 11,196,665 B1 | 12/2021 | Pereira et al. |
| 11,359,929 B2 | 6/2022 | Lee et al. |
| 11,391,597 B2 | 7/2022 | Teske |
| 11,441,911 B2 | 9/2022 | Kageyama et al. |
| 2002/0015024 A1 | 2/2002 | Westerman et al. |
| 2002/0082773 A1 | 6/2002 | Ikeuchi et al. |
| 2003/0178482 A1 | 9/2003 | Kisliakov |
| 2005/0190059 A1 | 9/2005 | Wehrenberg |
| 2005/0193117 A1 | 9/2005 | Morris |
| 2005/0222766 A1 | 10/2005 | Burch et al. |
| 2006/0017692 A1 | 1/2006 | Wehrenberg et al. |
| 2006/0033724 A1 | 2/2006 | Chaudhri et al. |
| 2006/0190167 A1 | 8/2006 | Inukai |
| 2006/0197753 A1 | 9/2006 | Hotelling |
| 2007/0088500 A1 | 4/2007 | Spinelli |
| 2007/0288162 A1 | 12/2007 | Furukawa |
| 2008/0120171 A1 | 5/2008 | Ikeuchi et al. |
| 2008/0136612 A1 | 6/2008 | Machii et al. |
| 2008/0195314 A1 | 8/2008 | Green |
| 2008/0262714 A1 | 10/2008 | Abramovich |
| 2009/0027399 A1 | 1/2009 | Sato et al. |
| 2009/0112462 A1 | 4/2009 | Lo |
| 2009/0271109 A1 | 10/2009 | Lee et al. |
| 2010/0036599 A1 | 2/2010 | Froeberg et al. |
| 2010/0131190 A1 | 5/2010 | Terauchi et al. |
| 2010/0321406 A1 | 12/2010 | Iwase et al. |
| 2011/0040480 A1 | 2/2011 | Tebbutt |
| 2011/0074350 A1 | 3/2011 | Kocher |
| 2011/0112710 A1 | 5/2011 | Meyer-ebeling et al. |
| 2011/0172909 A1 | 7/2011 | Kahn et al. |
| 2011/0177845 A1 | 7/2011 | Fasold |
| 2011/0178698 A1 | 7/2011 | Aben et al. |
| 2011/0224852 A1 | 9/2011 | Profitt-brown et al. |
| 2011/0238457 A1 | 9/2011 | Mason et al. |
| 2011/0246055 A1 | 10/2011 | Huck et al. |
| 2012/0004841 A1 | 1/2012 | Schunder |
| 2012/0066035 A1 | 3/2012 | Stanger et al. |
| 2012/0136567 A1 | 5/2012 | Wang et al. |
| 2012/0179521 A1 | 7/2012 | Nelson |
| 2012/0253596 A1 | 10/2012 | Ibrahim et al. |
| 2012/0259541 A1 | 10/2012 | Downey et al. |
| 2012/0271547 A1 | 10/2012 | Mori |
| 2012/0324228 A1 | 12/2012 | Padhye et al. |
| 2013/0024112 A1 | 1/2013 | Tate, Jr. |
| 2013/0060462 A1 | 3/2013 | Hansen |
| 2013/0116919 A1 | 5/2013 | Furuhata et al. |
| 2013/0124006 A1 | 5/2013 | Anantha et al. |
| 2013/0132019 A1 | 5/2013 | Suzuno |
| 2013/0179057 A1 | 7/2013 | Fisher et al. |
| 2013/0226443 A1 | 8/2013 | Scofield et al. |
| 2013/0297201 A1 | 11/2013 | Van Hende |
| 2013/0304377 A1 | 11/2013 | Van Hende |
| 2013/0328861 A1 | 12/2013 | Arikan et al. |
| 2013/0332070 A1 | 12/2013 | Fleizach et al. |
| 2013/0345959 A1 | 12/2013 | Van Os et al. |
| 2013/0345975 A1 | 12/2013 | Vulcano et al. |
| 2014/0107919 A1 | 4/2014 | Venkatraman et al. |
| 2014/0180582 A1 | 6/2014 | Pontarelli et al. |
| 2014/0197924 A1 | 7/2014 | Wegelin et al. |
| 2014/0214261 A1 | 7/2014 | Ramamoorthy et al. |
| 2014/0244110 A1 | 8/2014 | Tharaldson et al. |
| 2014/0365113 A1 | 12/2014 | Mcgavran et al. |
| 2014/0365120 A1 | 12/2014 | Vulcano et al. |
| 2014/0365122 A1 | 12/2014 | Mcgavran et al. |
| 2015/0015513 A1 | 1/2015 | Kwak et al. |
| 2015/0032366 A1 | 1/2015 | Man et al. |
| 2015/0051829 A1 | 2/2015 | Gearhart et al. |
| 2015/0081210 A1 | 3/2015 | Yeh et al. |
| 2015/0125042 A1 | 5/2015 | Haden et al. |
| 2015/0192426 A1 | 7/2015 | Foster et al. |
| 2015/0285652 A1 | 10/2015 | Peri et al. |
| 2015/0300823 A1 | 10/2015 | Kahn et al. |
| 2015/0338223 A1 | 11/2015 | Letz |
| 2015/0345958 A1 | 12/2015 | Graham |
| 2016/0047666 A1 | 2/2016 | Fuchs |
| 2016/0061623 A1* | 3/2016 | Pahwa ............... G06F 3/0488 701/440 |
| 2016/0078037 A1 | 3/2016 | Ziezold et al. |
| 2016/0102992 A1 | 4/2016 | Otero Diaz et al. |
| 2016/0124707 A1 | 5/2016 | Ermilov et al. |
| 2016/0138927 A1 | 5/2016 | Ettinger et al. |
| 2016/0187152 A1 | 6/2016 | Tanizaki et al. |
| 2016/0210834 A1 | 7/2016 | Dayal |
| 2016/0252362 A1 | 9/2016 | Tertoolen et al. |
| 2016/0252363 A1 | 9/2016 | Tertoolen et al. |
| 2016/0290818 A1 | 10/2016 | Kim et al. |
| 2016/0290822 A1* | 10/2016 | Kalyanaraman ....... G01C 21/20 |
| 2016/0298977 A1 | 10/2016 | Newlin et al. |
| 2016/0313138 A1 | 10/2016 | Chupakhin |
| 2016/0356613 A1 | 12/2016 | Hajj et al. |
| 2016/0358471 A1 | 12/2016 | Hajj et al. |
| 2016/0375306 A1 | 12/2016 | Gu et al. |
| 2017/0001649 A1 | 1/2017 | Dickow |
| 2017/0023373 A1 | 1/2017 | Buchholz et al. |
| 2017/0061708 A1 | 3/2017 | Sol |
| 2017/0074669 A1 | 3/2017 | Newlin et al. |
| 2017/0176195 A1 | 6/2017 | Rajagopalan et al. |
| 2017/0276502 A1 | 9/2017 | Fischer et al. |
| 2017/0328734 A1 | 11/2017 | Devkar et al. |
| 2017/0363437 A1 | 12/2017 | Baracco et al. |
| 2018/0058868 A1 | 3/2018 | Kang et al. |
| 2018/0080788 A1 | 3/2018 | Belvadi Shankaraiah et al. |
| 2018/0088966 A1 | 3/2018 | Chourasiya |
| 2018/0100742 A1 | 4/2018 | Greenwood et al. |

(56) References Cited

U.S. PATENT DOCUMENTS

| | | | |
|---|---|---|---|
| 2018/0113606 A1 | 4/2018 | Crawford et al. |
| 2018/0129276 A1 | 5/2018 | Nguyen et al. |
| 2018/0143029 A1 | 5/2018 | Nikulin et al. |
| 2018/0253617 A1 | 9/2018 | Tsai et al. |
| 2018/0266842 A1 | 9/2018 | Di Censo et al. |
| 2019/0003849 A1 | 1/2019 | Pahwa et al. |
| 2019/0178660 A1 | 6/2019 | Greenberg et al. |
| 2019/0178672 A1 | 6/2019 | Woolley |
| 2019/0219410 A1 | 7/2019 | Burgess et al. |
| 2019/0219411 A1 | 7/2019 | Christen et al. |
| 2019/0266890 A1 | 8/2019 | Lei et al. |
| 2019/0293447 A1 | 9/2019 | O'beirne et al. |
| 2019/0303088 A1 | 10/2019 | Yuan |
| 2019/0383637 A1 | 12/2019 | Teske |
| 2020/0012391 A1 | 1/2020 | Fleizach et al. |
| 2020/0026946 A1 | 1/2020 | Hu et al. |
| 2020/0096358 A1 | 3/2020 | Dal Bo et al. |
| 2020/0200551 A1 | 6/2020 | Fischer et al. |
| 2020/0273333 A1 | 8/2020 | Elshenawy |
| 2021/0004627 A1 | 1/2021 | Chen et al. |
| 2021/0102819 A1 | 4/2021 | Gallo et al. |
| 2021/0213959 A1 | 7/2021 | Shahriari et al. |
| 2021/0233393 A1 | 7/2021 | Sievers et al. |
| 2021/0255828 A1 | 8/2021 | Krishnan et al. |
| 2021/0302175 A1 | 9/2021 | Pishdadian et al. |
| 2021/0356281 A1 | 11/2021 | Hajj |
| 2021/0356287 A1 | 11/2021 | Hajj et al. |
| 2021/0356288 A1 | 11/2021 | Hajj et al. |
| 2021/0374285 A1 | 12/2021 | D'agostino |
| 2021/0389142 A1 | 12/2021 | Kim et al. |
| 2021/0389143 A1 | 12/2021 | Kim et al. |
| 2021/0389144 A1 | 12/2021 | Kim et al. |
| 2022/0089177 A1 | 3/2022 | Wang et al. |
| 2022/0221292 A1 | 7/2022 | Putnam et al. |
| 2022/0390248 A1 | 12/2022 | Apuy et al. |
| 2022/0391074 A1 | 12/2022 | Apuy et al. |
| 2023/0160714 A1 | 5/2023 | Apuy et al. |
| 2024/0094017 A1 | 3/2024 | Baum et al. |

FOREIGN PATENT DOCUMENTS

| | | |
|---|---|---|
| CN | 109990799 A | 7/2019 |
| DE | 102007050021 A1 | 4/2009 |
| EP | 1275936 A2 | 1/2003 |
| EP | 2378249 A1 | 10/2011 |
| EP | 2721844 A2 | 4/2014 |
| EP | 2825902 A1 | 1/2015 |
| EP | 3104122 A1 | 12/2016 |
| EP | 3343472 A1 | 7/2018 |
| EP | 3534119 A1 | 9/2019 |
| KR | 20130033948 A | 4/2013 |
| WO | 2012141827 A2 | 10/2012 |
| WO | 2013138183 A1 | 9/2013 |
| WO | 2013169849 A2 | 11/2013 |
| WO | 2014105276 A1 | 7/2014 |
| WO | 2016090282 A1 | 6/2016 |

OTHER PUBLICATIONS

Final Office Action received for U.S. Appl. No. 16/460,507, dated Aug. 11, 2020, 37 pages.
Final Office Action received for U.S. Appl. No. 16/460,507, dated Aug. 18, 2021, 40 pages.
Final Office Action received for U.S. Appl. No. 17/028,638, dated Mar. 22, 2021, 15 pages.
Final Office Action received for U.S. Appl. No. 17/028,675, dated Jul. 11, 2022, 14 pages.
Final Office Action received for U.S. Appl. No. 17/030,091, dated Aug. 17, 2022, 26 pages.
International Search Report received for PCT Patent Application No. PCT/US2021/032640, dated Oct. 13, 2021, 7 pages.
International Search Report received for PCT Patent Application No. PCT/US2021/037124, dated Jan. 21, 2022, 9 pages.
International Search Report received for PCT Patent Application No. PCT/US2022/072783, dated Jan. 20, 2023, 6 pages.
Non-Final Office Action received for U.S. Appl. No. 16/460,507, dated Apr. 6, 2020, 37 pages.
Non-Final Office Action received for U.S. Appl. No. 16/460,507, dated Feb. 22, 2022, 50 pages.
Non-Final Office Action received for U.S. Appl. No. 16/460,507, dated Feb. 25, 2021, 37 pages.
Non-Final Office Action received for U.S. Appl. No. 17/028,322, dated Jul. 28, 2022, 22 pages.
Non-Final Office Action received for U.S. Appl. No. 17/028,638, dated Jun. 7, 2022, 20 pages.
Non-Final Office Action received for U.S. Appl. No. 17/028,638, dated Nov. 2, 2021, 17 pages.
Non-Final Office Action received for U.S. Appl. No. 17/028,638, dated Nov. 16, 2020, 16 pages.
Non-Final Office Action received for U.S. Appl. No. 17/028,675, dated Jan. 20, 2022, 13 pages.
Non-Final Office Action received for U.S. Appl. No. 17/030,091, dated Feb. 4, 2022, 21 pages.
Non-Final Office Action received for U.S. Appl. No. 17/030,131, dated Apr. 4, 2022, 51 pages.
Non-Final Office Action received for U.S. Appl. No. 17/030,165, dated Feb. 1, 2022, 30 pages.
Non-Final Office Action received for U.S. Appl. No. 17/485,344, dated Dec. 7, 2021, 40 pages.
Notice of Allowance received for U.S. Appl. No. 16/460,507, dated Sep. 15, 2022, 35 pages.
Notice of Allowance received for U.S. Appl. No. 17/485,344, dated Apr. 19, 2022, 9 pages.
Restriction Requirement received for U.S. Appl. No. 17/028,322, dated Apr. 13, 2022, 6 pages.
Waze Suggestion Box, Available online at: <https://waze.uservoice.com/forums/59223-waze-suggestion-box/suggestions/803059-add-pause-option-for-stops?page=3&per_page=20>, [Retrieved Jul. 21, 2022], 2010, pp. 1-7.
What are the Best EV Route Planners?, enrg.io, Available online at: <https://enrg.io/what-are-the-best-ev-route-planners/>, [Retrieved Jul. 19, 2022], 2019, pp. 1-10.
Fingas Jon, "Tesla's in-Car Trip Planning Tool is Available on the Web", Engadget, Available online at: <https://www.engadget.com/2018-01-04-tesla-trip-planner-available-on-web.html#:-:text=There's%20now%20a%20better%20way,particular%20Tesla%20you're%20driving.> [Retrieved Jul. 19, 2022], Jan. 4, 2018, pp. 1-5.
Google,"Biking Directions on Google Maps", Available online at: <https://www.youtube.com/watch?v=JN5_NBSu7Lw>, [Retrieved Mar. 7, 2022], Mar. 10, 2010, 1 page.
Lambert Fred, "Tesla Launches a New Web-Based Trip Planning Tool Using the Supercharger Network", Electrek, Available online at: <https://electrek.co/2018/01/04/tesla-launches-new-web-based-trip-planning-tool-supercharger-network/> [Retrieved Jul. 19, 2022], Jan. 4, 2018, pp. 1-6.
Corrected Notice of Allowance received for U.S. Appl. No. 17/028,675, dated Jun. 15, 2023, 6 pages.
Corrected Notice of Allowance received for U.S. Appl. No. 17/030,091, dated Jun. 22, 2023, 6 pages.
Corrected Notice of Allowance received for U.S. Appl. No. 17/485,344, dated Oct. 3, 2022, 3 pages.
Final Office Action received for U.S. Appl. No. 17/028,322, dated Jan. 3, 2023, 22 pages.
Final Office Action received for U.S. Appl. No. 17/028,638, dated Dec. 7, 2022, 24 pages.
Final Office Action received for U.S. Appl. No. 17/030,165, dated Nov. 15, 2022, 50 pages.
International Search Report received for PCT Patent Application No. PCT/US2022/072600, dated Sep. 2, 2022, 5 pages.
Non-Final Office Action received for U.S. Appl. No. 17/030,165, dated May 24, 2023, 45 pages.
Non-Final Office Action received for U.S. Appl. No. 18/151,352, dated Jun. 23, 2023, 23 pages.
Notice of Allowance received for U.S. Appl. No. 17/028,322, dated Apr. 18, 2023, 8 pages.

(56) References Cited

OTHER PUBLICATIONS

Notice of Allowance received for U.S. Appl. No. 17/028,638, dated Apr. 4, 2023, 26 pages.
Notice of Allowance received for U.S. Appl. No. 17/028,675, dated Jan. 13, 2023, 9 pages.
Notice of Allowance received for U.S. Appl. No. 17/030,091, dated Feb. 3, 2023, 9 pages.
Notice of Allowance received for U.S. Appl. No. 17/030,131, dated Dec. 7, 2022, 11 pages.
Notice of Allowance received for U.S. Appl. No. 17/030,131, dated May 5, 2023, 5 pages.
Notice of Allowance received for U.S. Appl. No. 17/485,344, dated Sep. 9, 2022, 9 pages.
Welcome to EV Trip Planner Version 2.8, VTripPlanner, Available Online at: <https://web.archive.org/web/20180807120132/https://www.evtripplanner.com/planner/2-8/>, 2018, 3 pages.
Baum et al., "Shortest Feasible Paths with Charging Stops for Battery Electric Vehicles", ARXIV.org, Cornell University Library, Available online at: <https://doi.org/10.48550/arXiv.1910.09812>, [Retrieved on Sep. 8, 2022], Oct. 22, 2019, pp. 1-43.
Zündorf, Tobias, "Electric Vehicle Routing with Realistic Recharging Models", Available online at: <https://i11www.iti.kit.edu/_media/teaching/theses/ma-zuendorf-14.pdf>, [Retrieved on Aug. 22, 2022], Nov. 24, 2014, 94 pages.
Non-Final Office Action received for U.S. Appl. No. 17/030,165, dated Jan. 3, 2024, 49 pages.
Non-Final Office Action received for U.S. Appl. No. 17/448,857, dated Nov. 22, 2023, 38 pages.
Notice of Allowance received for U.S. Appl. No. 17/028,322, dated Aug. 3, 2023, 5 pages.
Notice of Allowance received for U.S. Appl. No. 18/151,352, mailed on Feb. 5, 2024, 9 pages.
Search Report received for Chinese Patent Application No. 202310692856.9, mailed on Feb. 24, 2024, 6 pages (3 pages of English Translation and 3 pages of Official Copy).

\* cited by examiner

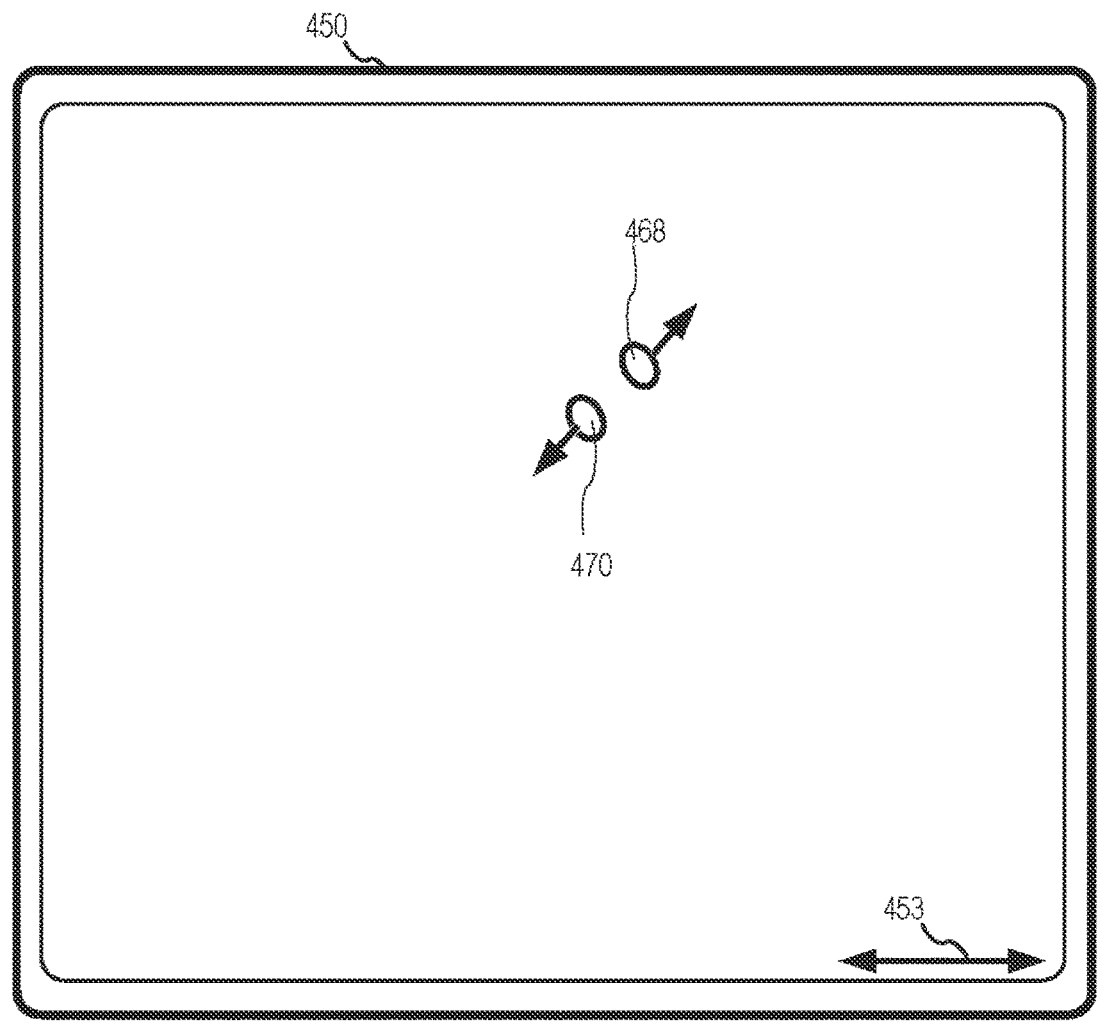
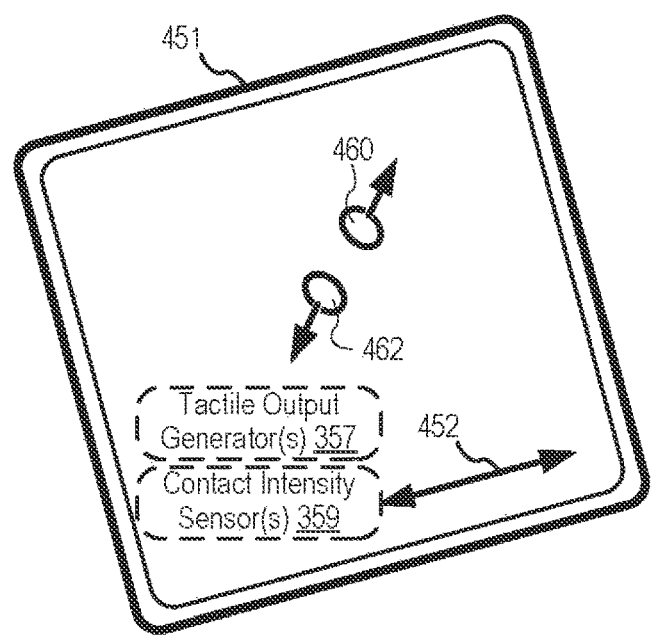
*FIG. 4B*

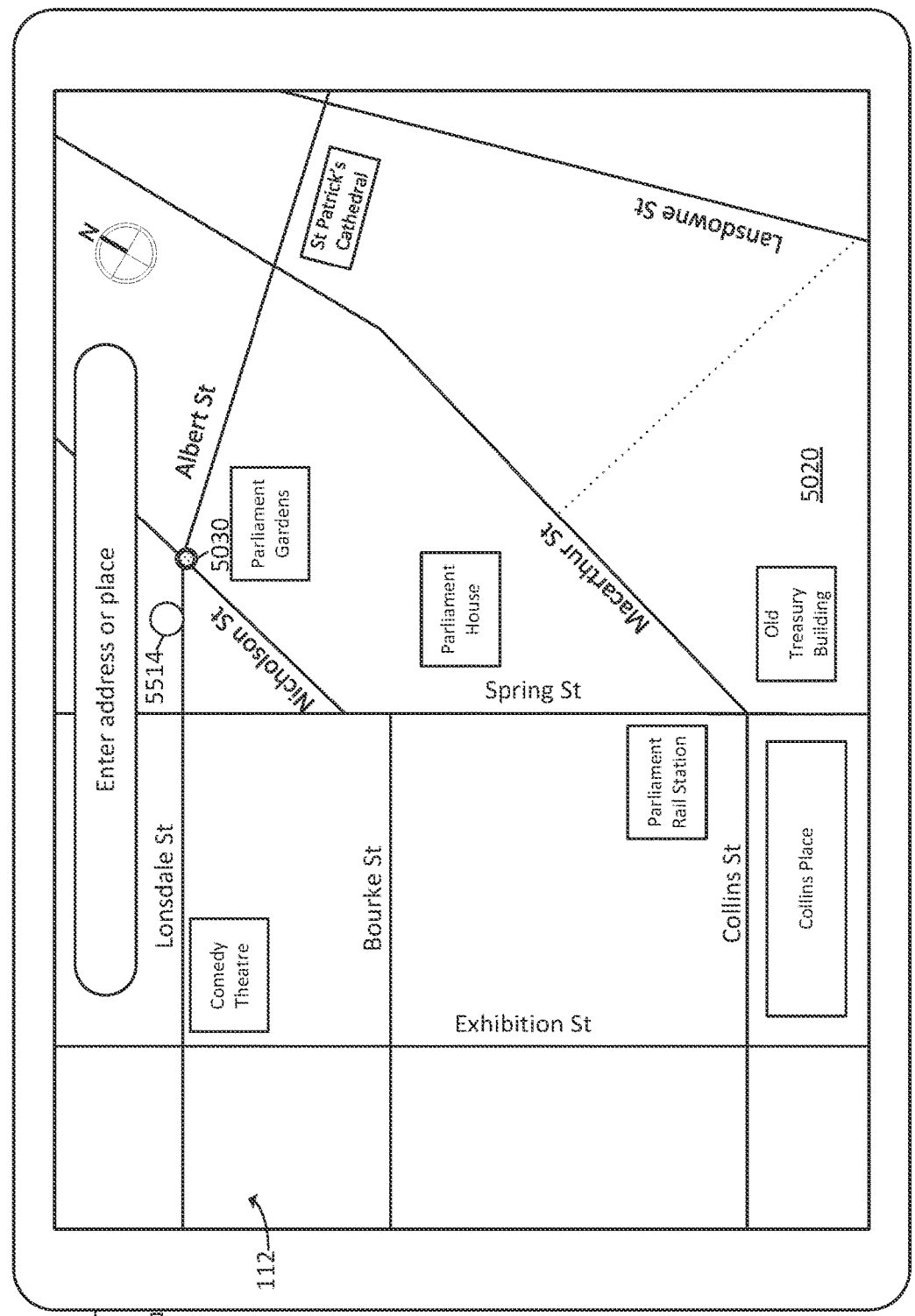

You traveled 100 yards north on Nicholson Street from the intersection of Spring Street and Nicholson Street. You are at a four-way intersection between Nicholson Street, Albert Street and Lonsdale Street. Your elevation increased by 2 feet. You passed Parliament Gardens while traveling north on Nicholson Street. A concert by XYZ band is currently playing at Parliament Gardens.

FIG. 6M

Taking Lonsdale Street southwest from the intersection of Lonsdale Street, Nicholson Street, and Albert Street leads you to a four-way intersection between Lonsdale Street and Spring Street. A section on Lonsdale Street going southwest is under maintenance and is inaccessible to pedestrians.

Provide audio that includes traversal information about traversing along the path in the geographic region in the first direction of navigation and from the starting location to the ending location
718

In response to detecting the second user input, and in accordance with a determination of at least one point of interest along the path between the starting location and the ending location, the audio of the traversal information includes audio information about at least one point of interest
720

In response to detecting the second user input, and in accordance with a determination of a distance from the starting location and the ending location, the audio of the traversal information includes audio information that includes the distance
722

In response to detecting the second user input, and in accordance with a determination of a distance from the starting location to a nearest intersection along the path and between the starting location and the ending location, the audio of the traversal information includes audio information about the distance from the starting location to the nearest intersection
724

In response to detecting the second user input, and in accordance with a determination of at least one hazard along the path between the starting location and the ending location, the audio of the traversal information includes audio information about the at least one hazard
726

In response to detecting the second user input, and in accordance with a determination of an elevation change along the path between the starting location and the ending location, audio of the traversal information includes audio information about the elevation change
728

In response to detecting the second user input:
in accordance with a determination that the detail setting of the traversal information is set at a first level, audio of the traversal information includes a first level of detail about traversing along the path in the geographic region from the starting location to the ending location; and
in accordance with a determination that the detail setting of the traversal information is set at a second level, audio of the traversal information includes a second level of detail about traversing along the path in the geographic region from the starting location to the ending location
730

In response to detecting the second user input, provide an audio description of the ending location
732

FIG. 7B

SYSTEMS AND METHODS FOR EXPLORING A GEOGRAPHIC REGION

CLAIM OF PRIORITY

This application is a continuation of U.S. patent application Ser. No. 16/460,507, filed on Jul. 2, 2019 (published as U.S. Publication No. 2020-0012391), which claims the benefit of U.S. Provisional Patent Application No. 62/693,812, entitled "SYSTEMS AND METHODS FOR EXPLORING A GEOGRAPHIC REGION," filed on Jul. 3, 2018, which are hereby incorporated by reference in their entireties for all purposes.

FIELD

The present disclosure relates generally to computer user interfaces, and more specifically to techniques for exploring a geographic region that is displayed on computer user interfaces.

BACKGROUND

Certain applications that run on electronic devices provide user interfaces that display digital maps or other types of representations of cities, states, countries, or other geographic regions. For example, a user will, in some circumstances, interact with user interfaces of a map-based application to view digital maps of a geographic region. The user will, in some circumstances, search for a location of the geographic region, directions from a starting location to an ending location, or a point of interest in the geographic region.

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif), an image management application (e.g., Photos from Apple Inc. of Cupertino, Calif), a digital content (e.g., videos and music) management application (e.g., iTunes from Apple Inc. of Cupertino, Calif), a drawing application, a presentation application (e.g., Keynote from Apple Inc. of Cupertino, Calif), a word processing application (e.g., Pages from Apple Inc. of Cupertino, Calif), or a spreadsheet application (e.g., Numbers from Apple Inc. of Cupertino, Calif).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

As described above, one aspect of the present technology is the gathering and use of data available from specific and legitimate sources to improve exploration of an area by visually impaired users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, data of the user's previous routes data be used, in accordance with the user's preferences to plan current and future routes.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of exploring a geographic region, the present technology can be configured to allow users to select to "opt in" or "opt out" of participation in the collection of personal information data while the user is exploring a geographic region or anytime thereafter. In another example, users can select not to provide data associated with the user's current location, route, or traveling preferences. In yet another example, users can select to limit the amount of shared data, such as only sharing the user's current location, only sharing the user's current route, as well as other limiting features that limit the amount of information shared by the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

BRIEF SUMMARY

Current methods for displaying user interfaces for exploring a geographic region are outdated, time consuming, and inefficient. For example, some existing methods use complex and time-consuming user interfaces, which may include multiple key presses or keystrokes, and may include extraneous user interfaces. In addition, these methods take longer than necessary, thereby wasting energy. This latter consideration is particularly important in battery-operated devices.

Accordingly, the present technique provides electronic devices with faster, more efficient methods and interfaces for exploring a geographic region. Such methods and interfaces optionally complement or replace other methods for exploring a geographic region. Such methods and interfaces reduce the number, extent, and/or nature of the inputs from a user, reduce the cognitive burden on the user, and produce a more efficient human-machine interface. For battery-operated computing devices, such methods and interfaces conserve power and increase the time between battery charges. Further, such methods and interfaces also streamline exploration of geographic regions, which reduce unnecessary received inputs and improves user efficiency and output.

The above deficiencies and other problems associated with user interfaces for electronic devices (e.g., with touch-sensitive surfaces) are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and one or more input devices. The method includes displaying a map of a geographic region on the display. The method also includes detecting, via the one or more input devices, a first user input to select a starting location on the map. After detecting the first user input, the method further includes detecting, via the one or more input devices, a second user input to select a first direction of navigation from the starting location. In response to detecting the second user input, the method further includes determining a path on the map that traverses in the first direction of navigation and connects the starting location to an ending location, and providing audio that includes traversal information about traversing along the path in the geographic region in the first direction of navigation and from the starting location to the ending location.

In accordance with some embodiments, a non-transitory computer-readable storage medium comprising one or more programs, the one or more programs including instructions which, when executed by an electronic device with a display and one or more input devices, causes the electronic device to display a map of a geographic region on the display. The instructions also cause the electronic device to detect, via the one or more input devices, a first user input to select a starting location on the map. After detecting the first user input, the instructions also cause the electronic device to detect, via the one or more input devices, a second user input to select a first direction of navigation from the starting location. In response to detecting the second user input, the instructions also cause the electronic device to determine a path on the map that traverses in the first direction of navigation and connects the starting location to an ending location, and provide audio that includes traversal information about traversing along the path in the geographic region in the first direction of navigation and from the starting location to the ending location.

In accordance with some embodiments, an electronic device includes a display, one or more input devices, one or more processors, memory, and one or more programs; the one or more programs are stored in the memory and configured to be executed by the one or more processors, and the one or more programs include instructions for performing or causing performance of the operations of any of the methods described herein. In accordance with some embodiments, a non-transitory computer readable storage medium has stored therein one or more programs, the one or more programs including instructions which, when executed by one or more processors of an electronic device with a display and one or more input devices, cause the electronic device to perform or cause performance of the operations of any of the methods described herein. In accordance with some embodiments, a graphical user interface on an electronic device with a display and one or more input devices, memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, one or more input devices, and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for exploring a geographic region, thereby increasing the effectiveness, efficiency, and user satisfaction with such devices. Such methods and interfaces may complement or replace other methods for exploring a geographic region.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7D are flow diagrams of a process for exploring a geographic region in accordance with some embodiments.

DESCRIPTION OF EMBODIMENTS

Figure 1A:
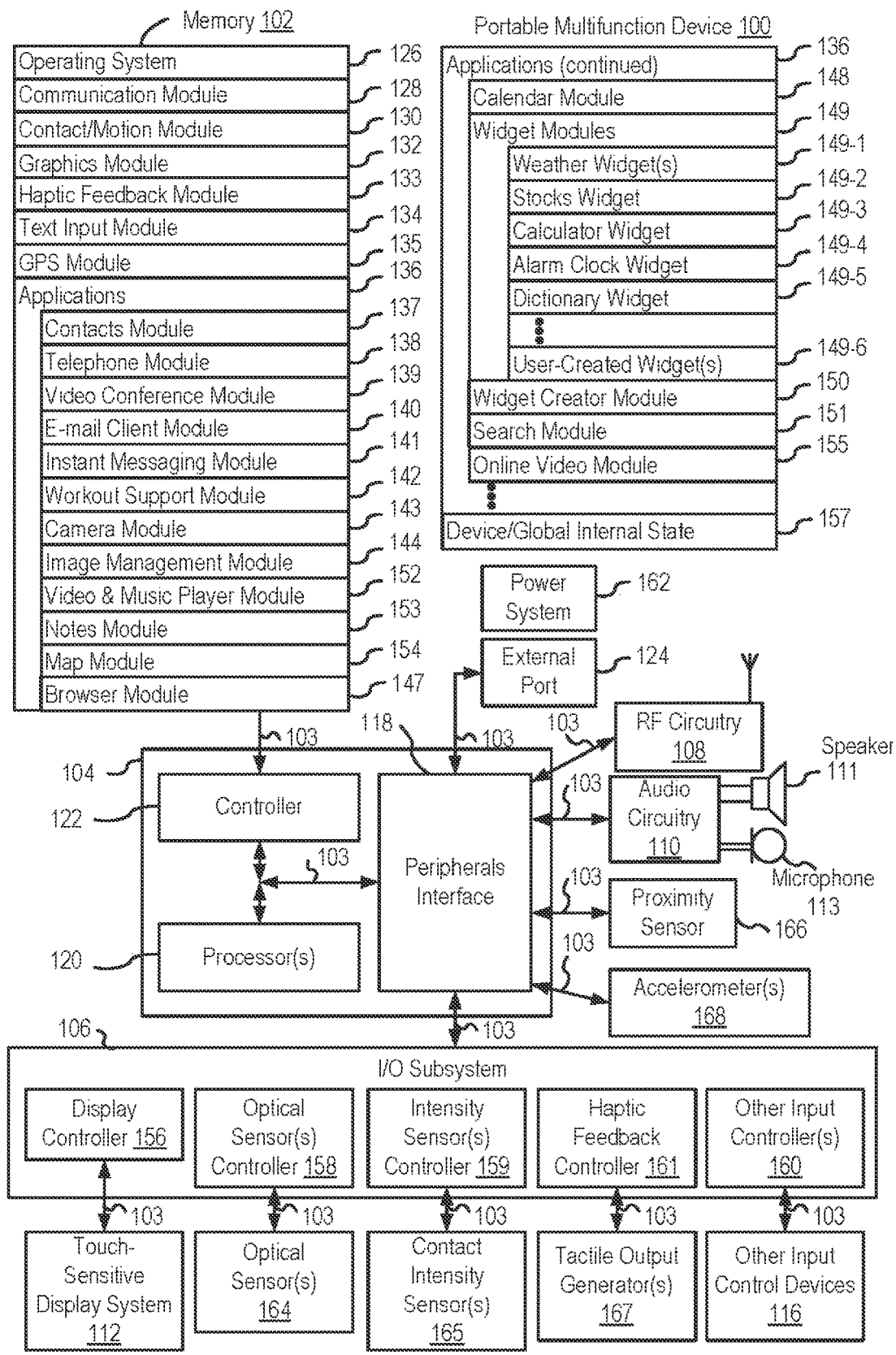
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for exploring a geographic region via user interfaces displayed on the electronic devices. Such techniques can reduce the cognitive burden on a user who accesses user interfaces to explore the geographic region, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for displaying user interfaces for exploring a geographic region. FIGS. 6A-6R illustrate exemplary user interfaces for exploring a geographic region. FIGS. 7A-7D are flow diagrams illustrating methods of displaying user interfaces for exploring a geographic region in accordance with some embodiments. The user interfaces in FIGS. 6A-6R are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
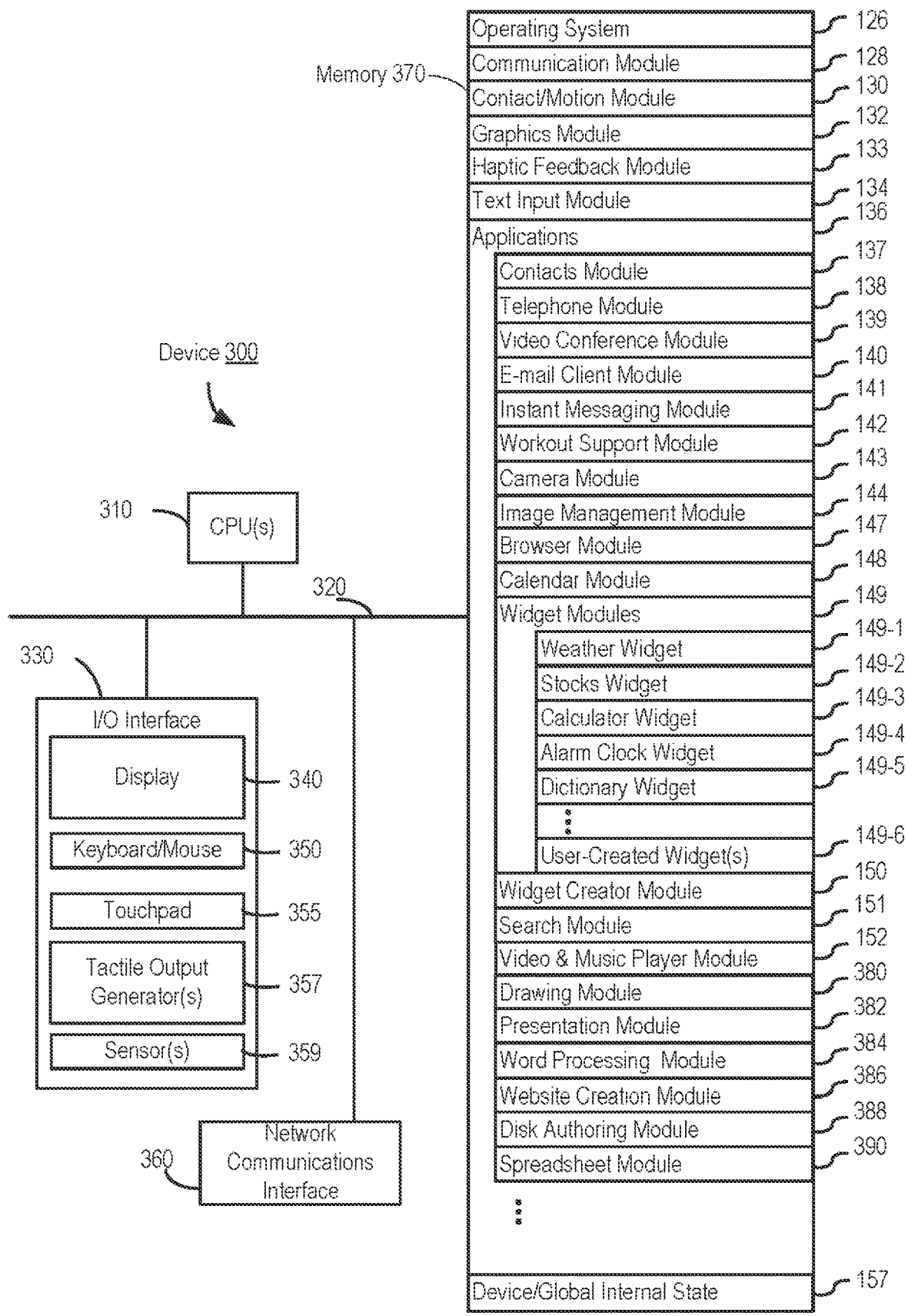
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client moduel 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
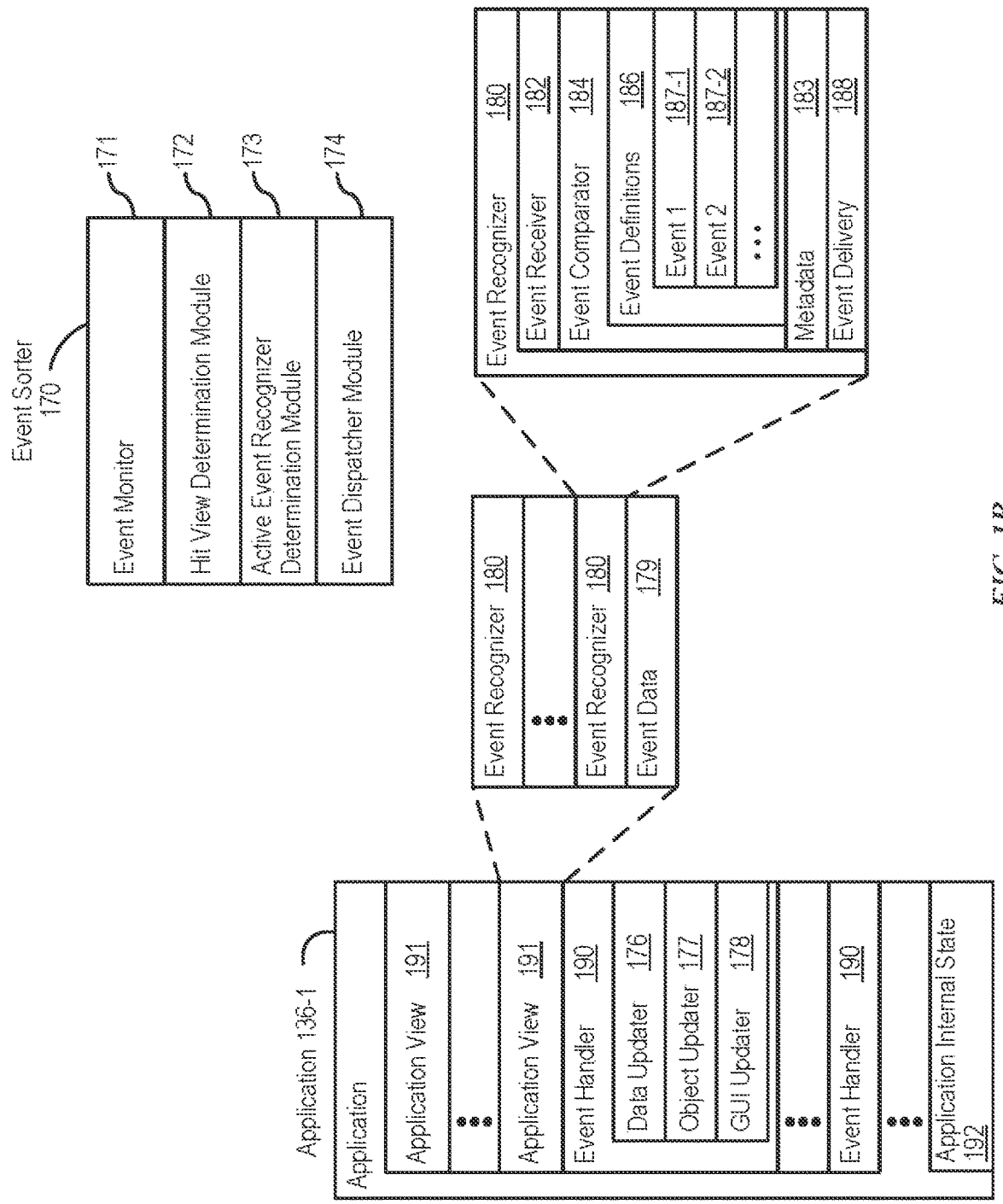
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
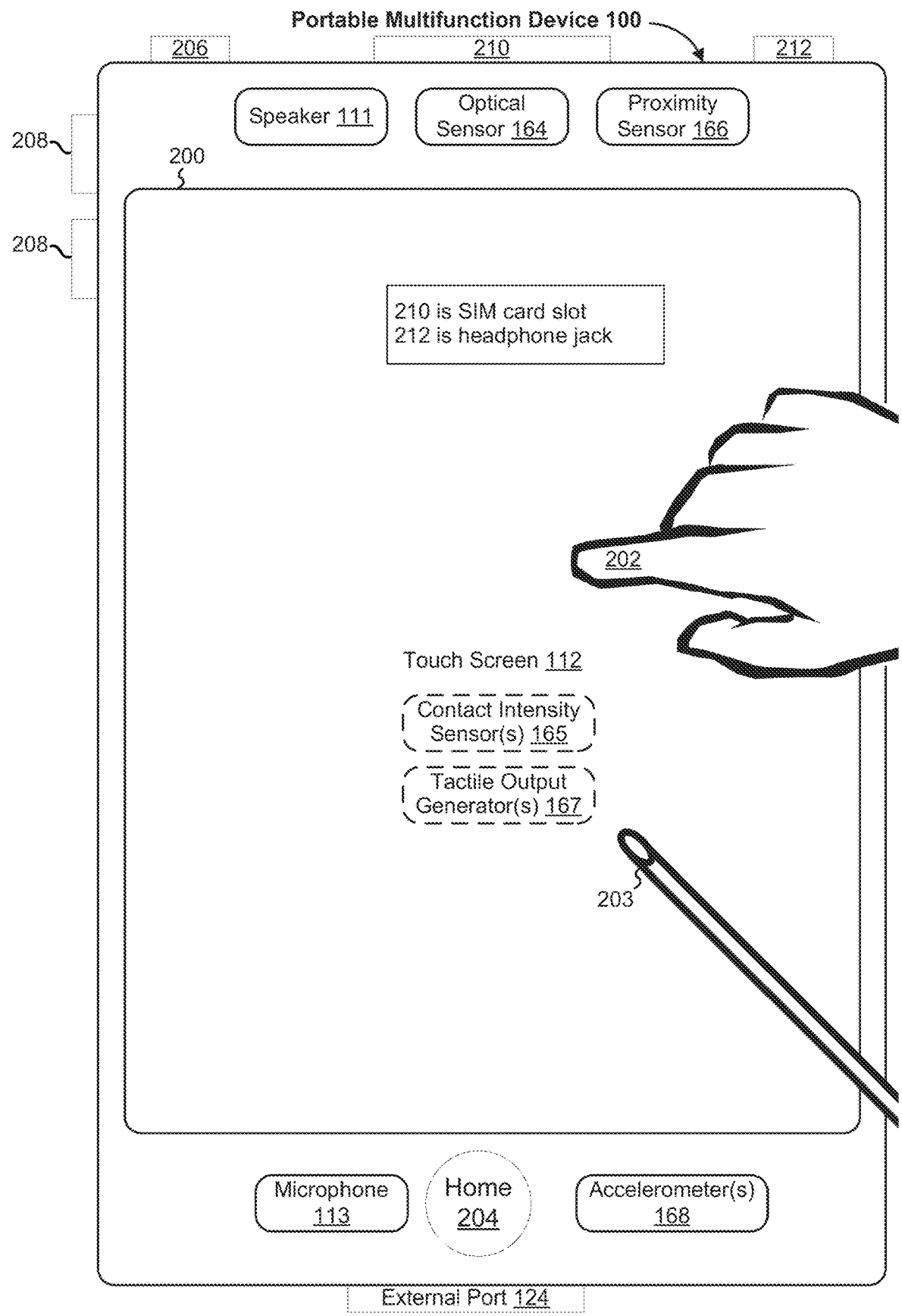
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
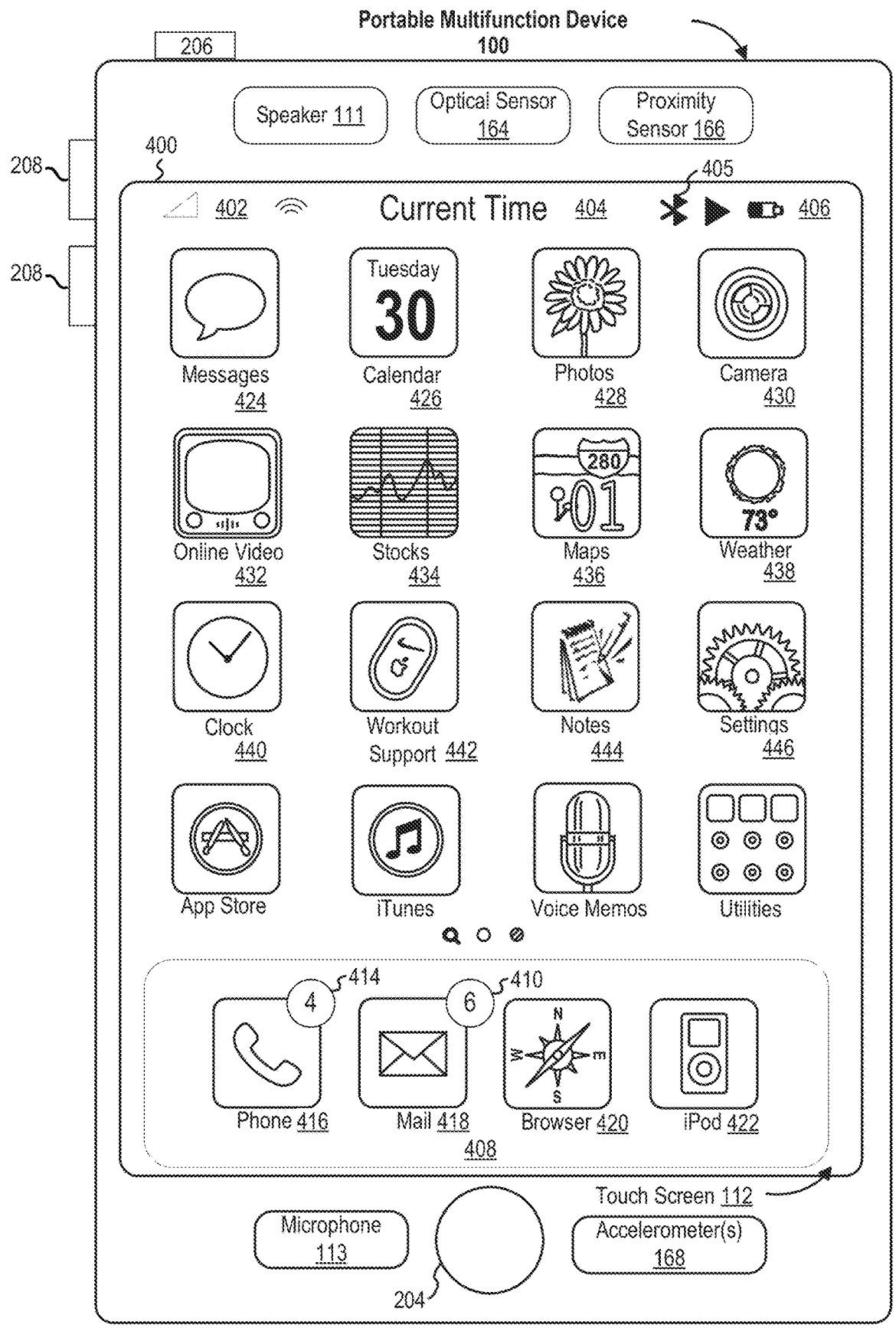
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
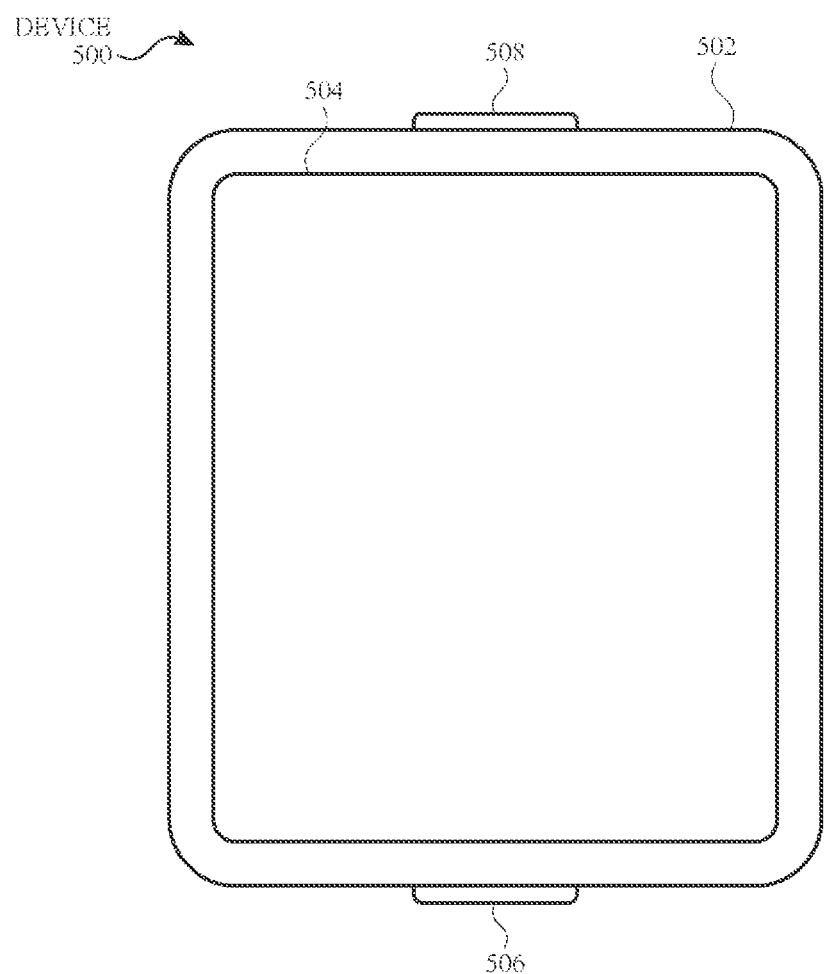
FIG. 5A illustrates a personal electronic device in accordance with some embodiments.
Figure 6A:
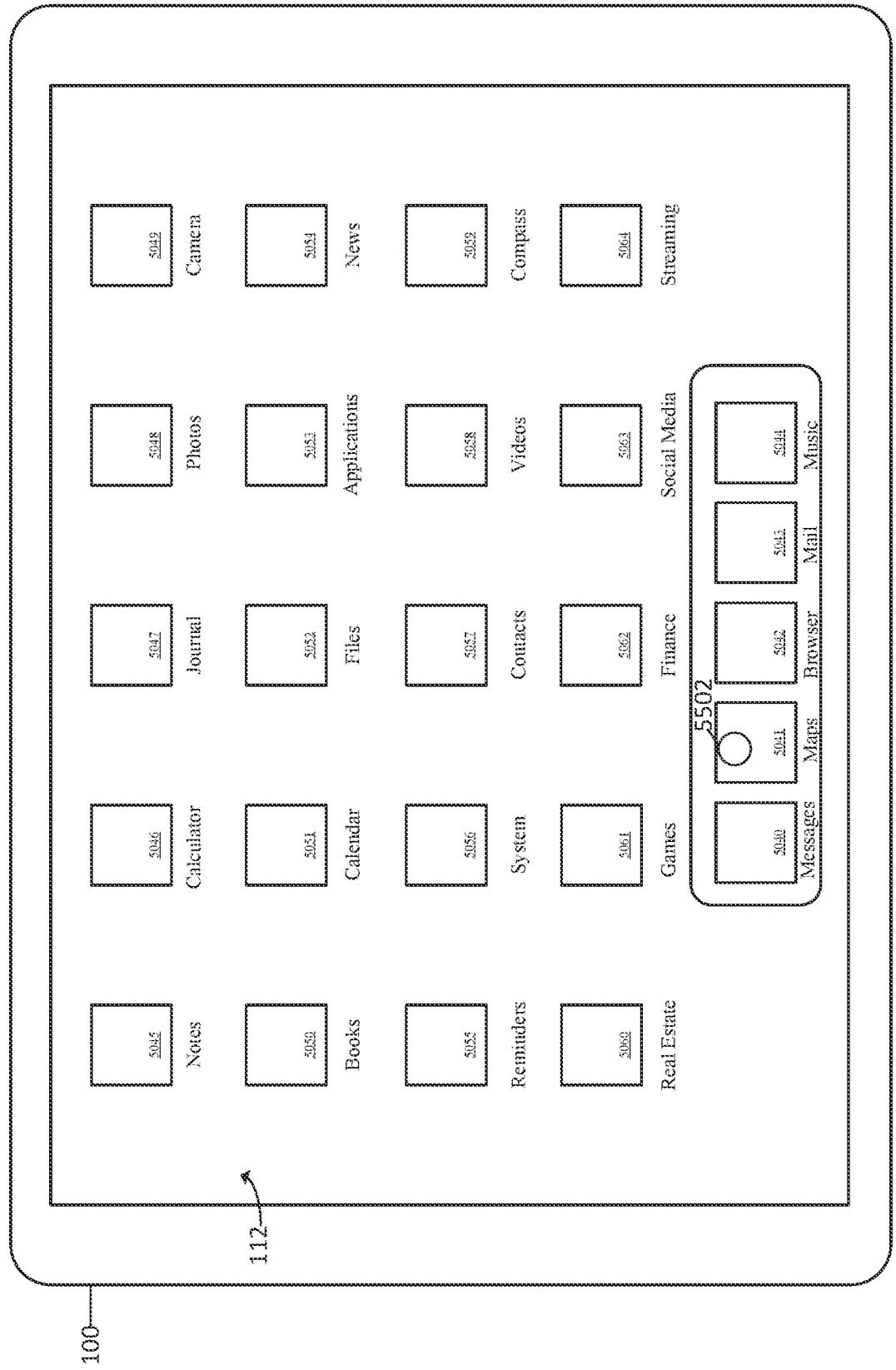
FIGS. 6A-6R illustrate example user interfaces for exploring a geographic region in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
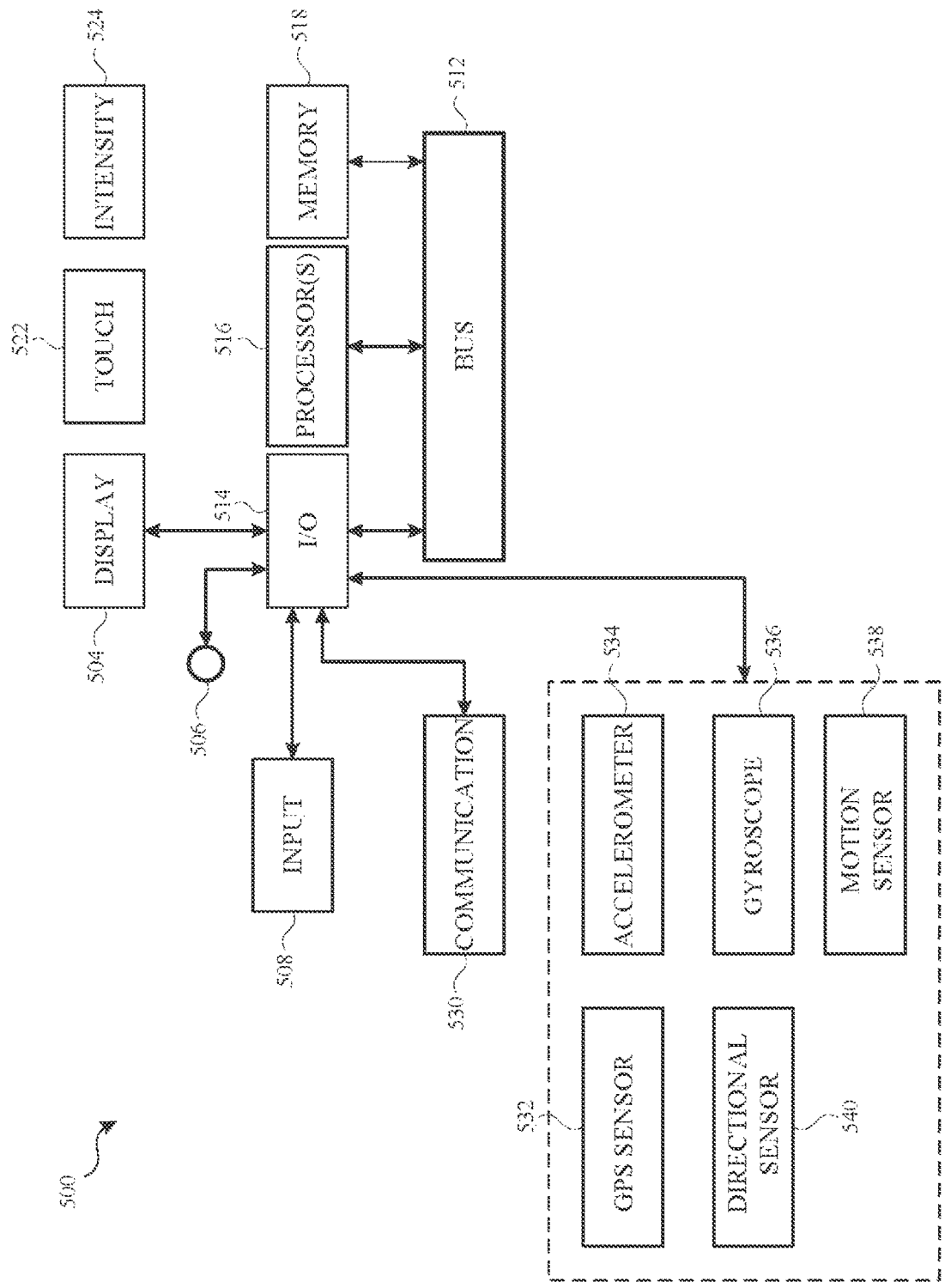
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UP") and associated processes that are implemented on an electronic device, such as portable multifunction device 100, device 300, or device 500.

FIGS. 6A-6R illustrate exemplary user interfaces for exploring a geographic region in accordance with some embodiments. The user interfaces in these figures are used to illustrate the processes described below, including the processes in FIGS. 7A-7D. Although some of the examples that follow will be given with reference to inputs on a touch-screen display (where the touch-sensitive surface and the display are combined) such as touch-sensitive display 112, in some embodiments, the device 100 detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

FIG. 6A illustrates device 100 having multiple application affordances 5040-5064 displayed on display 112 of device 100. In the illustrated embodiment, an application affordance is an affordance that the user interacts with to access user interfaces of a corresponding application that runs on device 100. In the illustrated embodiment, a maps affordance 5041 is an application affordance of a maps application. As used herein, a maps application is an application that provides digital maps for display in user interfaces of the application. In some embodiments, the maps application is a web maps application. In some embodiments, the user interacts with maps affordance 5041 to access user interfaces of the maps application. In one or more embodiments, the user provides an audio command (e.g., "open maps application") to open the maps application.

Figure 6B:
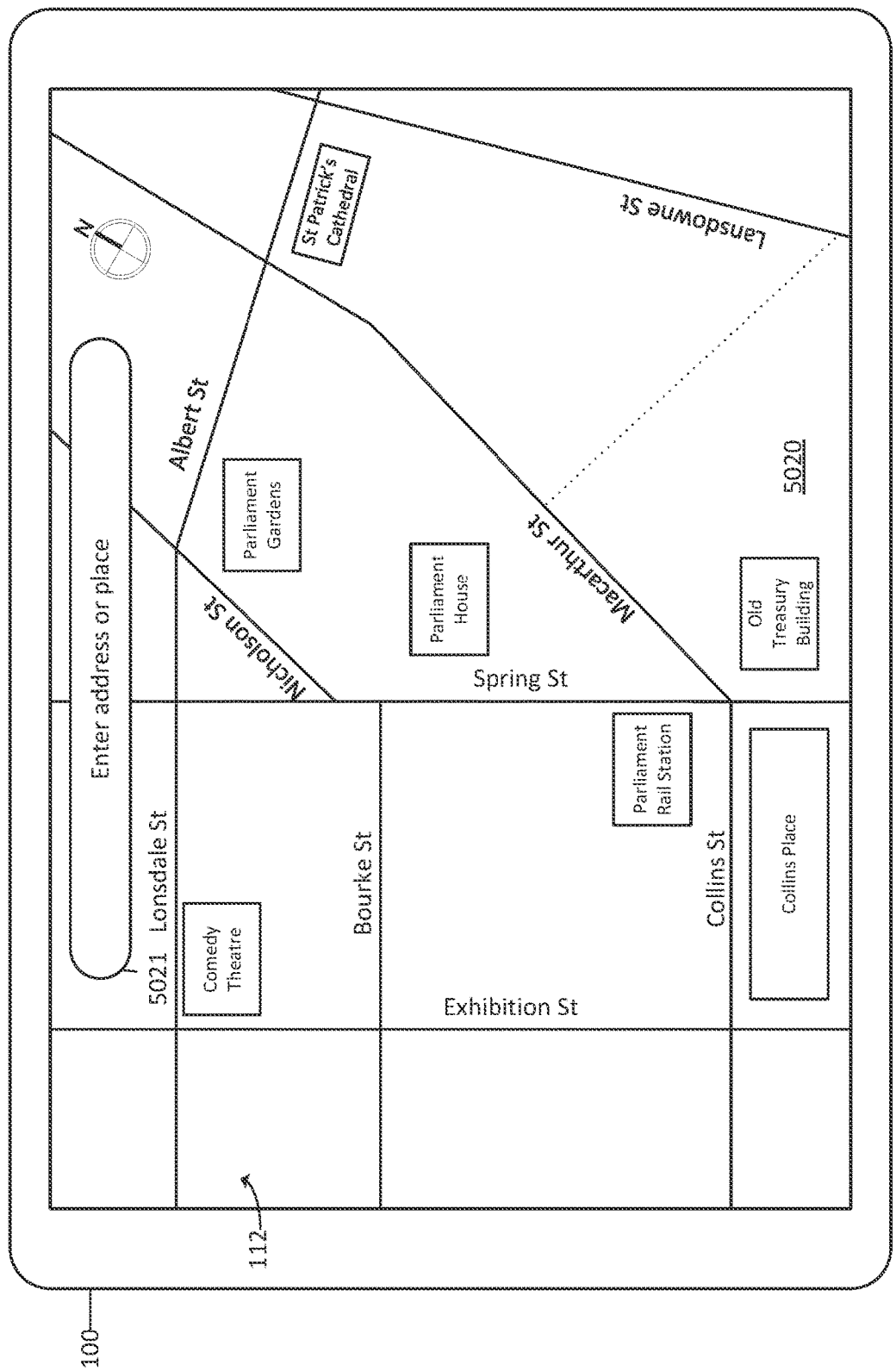

FIGS. 6A-6B illustrate detecting a tap gesture with contact 5502 over maps affordance 5041, and in response to detecting the tap gesture, displaying a user interface 5020 of the maps application. As shown in FIG. 6B, a digital map of a geographic region is displayed in user interface 5020. As used herein, a geographic region is an area of the earth. Examples of geographic regions include, but are not limited to, districts, cities, counties, states, countries, areas assigned to postal codes, campus areas, as well as other areas of the earth. In the illustrated embodiment of FIGS. 6B-6R, a digital map of an area of Melbourne, Australia is displayed in user interface 5020 in response to detecting the tap gesture illustrated in FIG. 6A. In one or more embodiments, digital maps of other areas of the earth are displayed in user interface 5020. While user interface 5020 is displayed on device 100, the user enters inputs to explore the geographic region that is displayed in user interface 5020. In one or more embodiments, the user performs a variety of gestures (e.g., tap gestures, double tap gestures, swipe gestures, drag gestures, etc.) over the digital map of the geographic region that is displayed in user interface 5020 of FIGS. 6B-6R to explore the geographic region. In one or more embodiments, the user provides audio commands (e.g., "designate the intersection of Bourke Street and Spring Street as a starting location") to device 100 to designate a starting location to start exploring the geographic region. In one or more embodiments, the user enters one or more locations in a search bar 5021 (e.g., "20 Spring Street, Melbourne VIC 3000, Australia," "Old Treasury Building," etc.) of FIG. 6B to explore the locations or to explore paths that connect the one or more locations. Additional descriptions of user inputs to explore the geographic region are provided in the paragraphs below and are illustrated in at least FIGS. 6C-6Q.

Figure 6C:
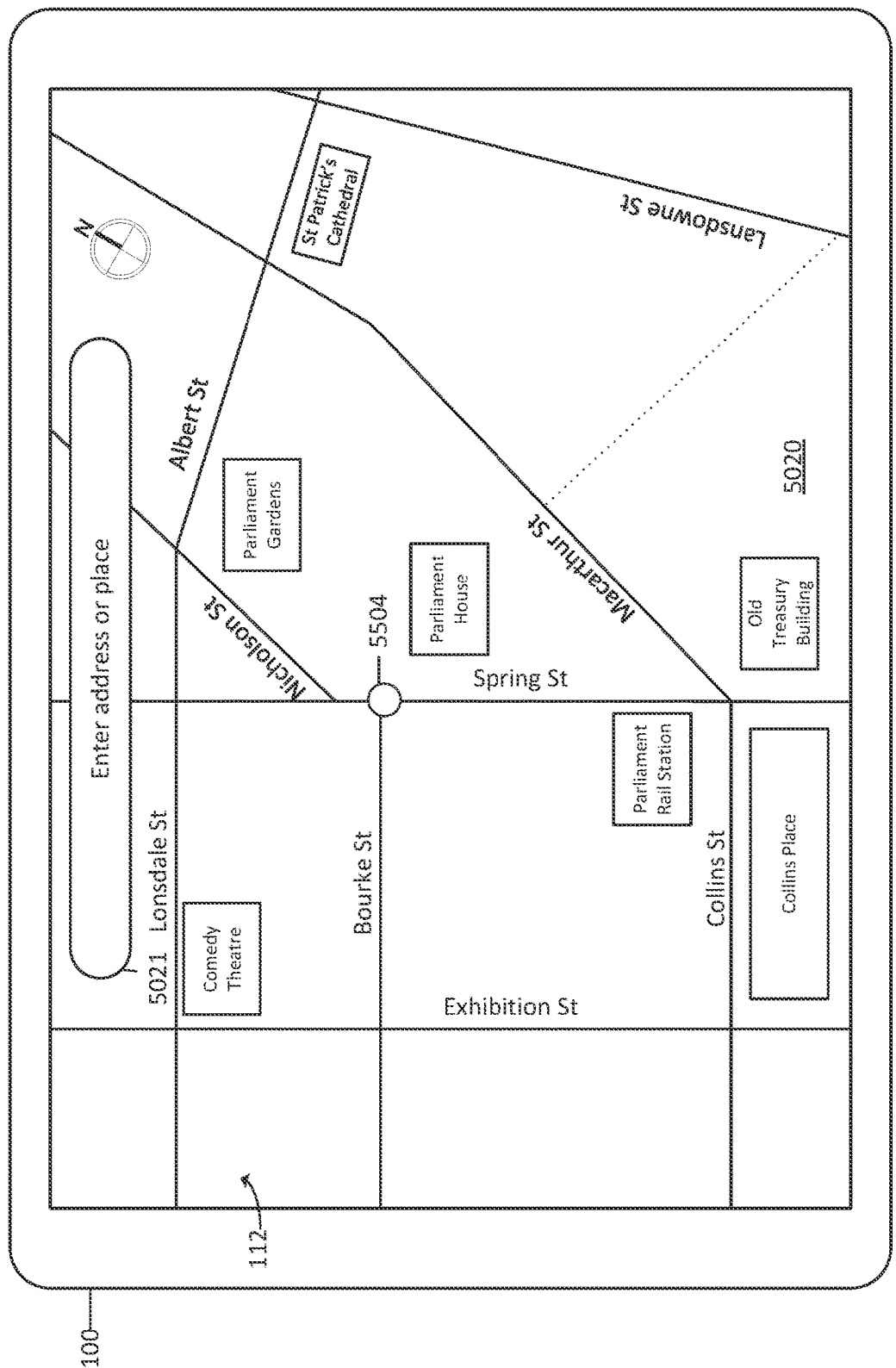
Figure 6D:
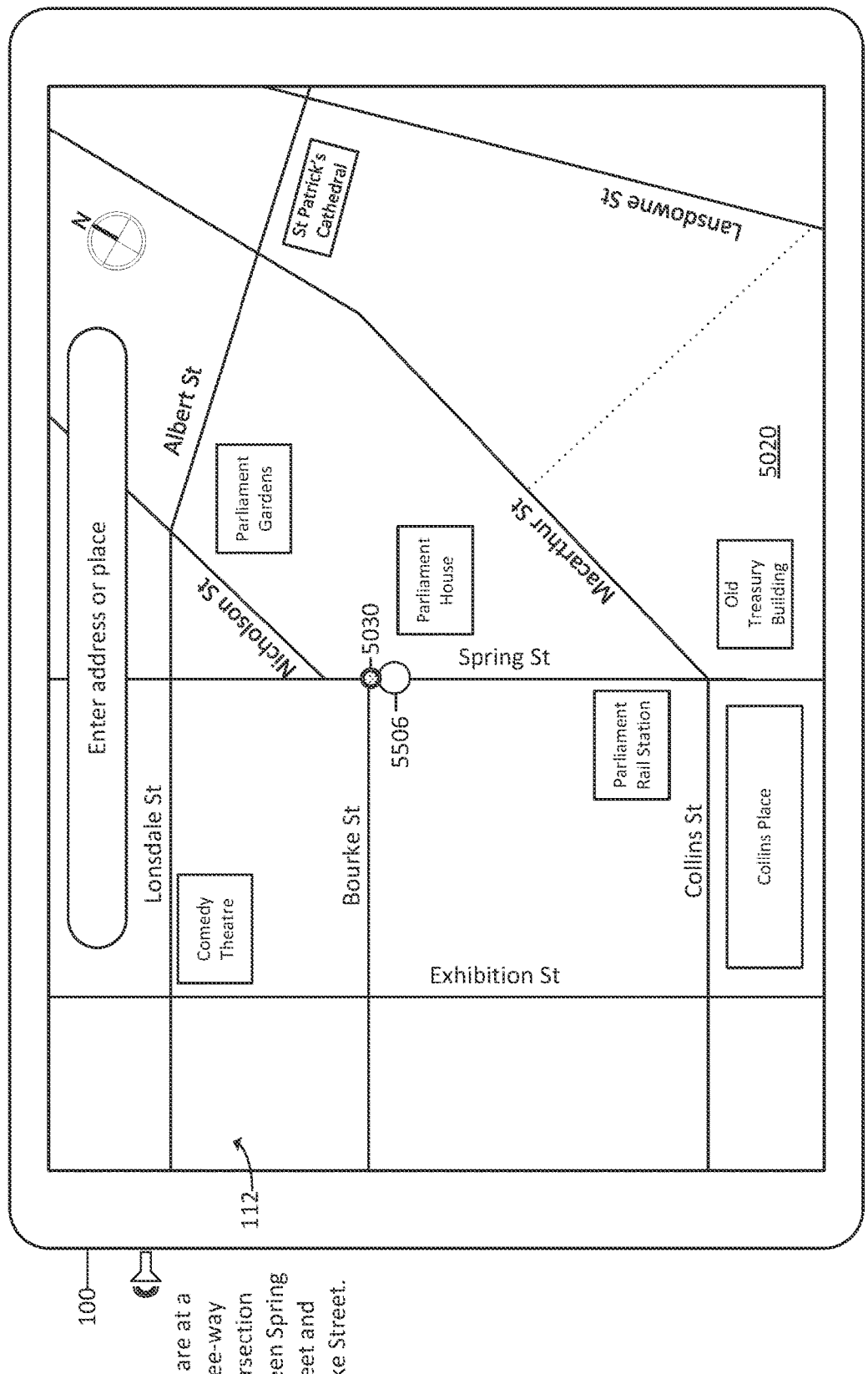

FIGS. 6C-6D illustrate detecting a double tap gesture with contact 5504 over a three-way intersection between Bourke Street and Spring Street, and in response to detecting the double tap gesture, designating the three-way intersection between Bourke Street and Spring Street as a starting location. As used herein, a starting location is a location (e.g., the four-way intersection between Collins Street and Exhibition Street) the user starts at to explore an area of a geographic region. In some embodiments, where the user explores traversing along multiple paths (e.g., Spring Street heading northwest followed by Nicholson Street heading north, etc.) of the geographic region, each path has a starting location (e.g., the starting location of Spring Street heading northwest is the three-way intersection between Spring Street and Bourke Street, the starting location of Nicholson Street heading north is the four-way intersection between Nicholson Street and Spring Street etc.), from where, the user explores an area of the geographic region along or near the respective path. In some embodiments, an indication of the starting location is displayed in user interface 5020 of the maps application. In the illustrated embodiment of FIG. 6D, a starting location indicator 5030 is displayed around the intersection between Bourke Street and Spring Street to indicate the starting location on the digital map of the geographic region. In one or more embodiments, another type of indication (e.g., a pin, a square, etc.) is displayed around the starting location.

In some embodiments, device 100 provides an audio of a description of the starting location. In one or more of such embodiments, device 100 provides an audio of a description of the starting location while displaying an indicator of the starting location (e.g., starting location indicator 5030 of FIG. 6D) to help the user simultaneously visualize the starting location on the digital map and learn about the starting location. In one or more of such embodiments, where the user is visually impaired, the audio of the description of the starting location helps the user explore the starting location and the nearby area without having to visually comprehend the digital map. In one or more of such embodiments, where the user is not visually impaired, the audio of the description of the starting location provides the user with useful information about the starting location and the nearby area. In the illustrated embodiment of FIG. 6D, the audio informs the user that the user is at a three-way intersection between Spring Street and Bourke Street. In one or more embodiments, the audio also includes additional information about the starting location and the nearby area, such as information about nearby points of interest (e.g., Parliament House, Parliament Rail Station, etc.), nearby events (e.g., an ongoing concert at Parliament Gardens), distances to nearby intersections (e.g., the intersection between Nicholson Street and Albert Street, the intersection of Bourke Street and Exhibition Street, etc.), street names and cardinal directions of thoroughfares that are connected to the starting location, nearby hazards (e.g., a section of Lonsdale Street heading southwest is under maintenance), as well as other information about the starting location or the nearby area.

In some embodiments, the level of detail (verbosity setting) of the description of the starting location is adjustable (e.g., low level of detail, medium level of detail, high level of detail, etc.). In one or more embodiments, where the verbosity setting is set at a low level, audio of the description of the starting location only includes the street name of the thoroughfare the starting location is on. In one or more of such embodiments, where the verbosity setting is set at a medium level, the audio of the description of the starting location also includes information about nearby hazards. In one or more of such embodiments, where the verbosity setting is set at a high level, the audio of the description of the starting location also includes information about nearby points of interest and events. In one or more embodiments, the level of detail of the description of the starting location is user-customizable. For example, the user customizes the verbosity level to receive information about nearby restaurants (or specific nearby restaurants), but not about nearby landmarks. In one or more embodiments, device 100 adjusts the verbosity setting based on prior user preferences. In one or more embodiments, the user optionally performs one or more inputs to replay the audio containing the description of the starting location (e.g., by selecting a replay affordance (not shown), by providing an audio command to replay the audio, etc.). In such embodiments, device 100, in response to detecting inputs to replay the audio, provides the audio containing the description of the starting location. In some embodiments, device 100, in response to detecting the user's input to select a starting location, displays content containing a description of the starting location in user interface 5020 of the maps application. In one or more of such embodiments, device 100 provides an audio containing the description of the starting location while displaying content of the description of the starting location is displayed in user interface 5020.

After the user selects a starting location (e.g., the three-way intersection between Bourke Street and Spring Street of FIG. 6D), the user enters certain inputs to select a direction of navigation from the starting location. As used herein, a direction of navigation refers to a direction relative to the starting location. In one or more embodiments, the inputs include a tap gesture over another location on the digital map, such as a tap gesture over Parliament Rail Station (a point of interest), a tap gesture near Spring Street heading southeast from the starting location, or a tap gesture over another location of the digital map. In one or more of such embodiments, where an input to select a direction of navigation is a tap gesture, the direction of navigation is a cardinal direction of a thoroughfare among thoroughfares that are connected to the starting location, and relative to the other thoroughfares that are connected to the starting location, is closest to the location on the map that is selected by the tap gesture. For example, if the starting location is the four-way intersection between Exhibition Street and Bourke Street and device 100 detects a tap gesture over Comedy Theatre, device 100, in response to the tap gesture, determines that Exhibition Street heading northwest from the starting location would lead the user closest to Comedy Theatre, and designates northwest as the direction of navigation. In one or more embodiments, the inputs also include drag gestures around the starting location, such as a circular or a semi-circular drag gesture around the three-way intersection between Bourke Street and Spring Street. In one or more of such embodiments, the direction of navigation is based on the direction of the drag gesture relative to the starting location. In one or more of such embodiments, the direction of navigation is a cardinal direction of a thoroughfare that is connected to the starting location and is closest to the current position of the drag gesture. In one or more embodiments, the inputs also include swipe gestures in a direction of navigation, such as a swipe gesture along Spring Street heading southeast from the starting location, or a swipe gesture along another thoroughfare that is connected to the starting location. In one or more embodiments, the inputs also include audio commands to designate the direction of navigation (e.g., "travel on Bourke Street heading southwest from the intersection of Bourke Street and Spring Street"), as well as other suitable inputs to select the direction of navigation. In the embodiment of FIG. 6D, the user performs a tap gesture with contact 5506 over Spring Street heading southeast from the three-way intersection between Bourke Street and Spring Street to select a direction of navigation (southeast) from the three-way intersection between Bourke Street and Spring Street.

Device 100, in response to detecting the user's input to select a direction of navigation from the starting location (e.g., the three-way intersection between Bourke Street and Spring Street of FIG. 6D), determines a path that traverses from the starting location to an ending location. As used herein, a path is formed from one or more thoroughfares (e.g., streets, sidewalks, footpaths, etc.) that are accessible to the user. In one or more embodiments, the path is formed from one or more thoroughfares that are accessible to pedestrians. Further, an ending location is a stop or a destination along or near the path from the starting location and in the direction of navigation. In some embodiments, the ending location is the nearest intersection from the starting location in the direction of navigation. In one or more embodiments, the ending location is a point of interest along a path from the starting location. In some embodiments, the user enters one or more inputs to designate the ending location, such as by performing a double tap gesture over the ending location (e.g., the four-way intersection between Lonsdale Street and Exhibition Street) or near the ending location (e.g., by selecting Comedy Theatre), by providing an audio command to designate the ending location, or by entering another suitable input to designate the ending location. In one or more of such embodiments, the ending location is a user-designated intersection from the starting location in the direction of navigation. In one or more of such embodiments, the ending location is a user-designated point of interest. In some embodiments, device 100 determines the ending location based on the starting location and the direction of navigation. In one or more of such embodiments, device 100 selects the nearest intersection from the starting location and in the direction of navigation as the ending location. For example, device 100, in the embodiment of FIGS. 6D-6E, detects a tap gesture with contact 5506 over Spring Street heading southeast (the direction of navigation) from the three-way intersection between Bourke Street and Spring Street (the starting location), and in response to detecting the tap gesture, designates the four-way intersection between Spring Street, Macarthur Street, and Collins Street, which is the next intersection from the three-way intersection between Bourke Street and Spring Street, and is in the direction of navigation, as the ending location. In one or more embodiments, device 100 selects the nearest point of interest or a point of interest the user is likely interested in exploring as the ending location.

Figure 6E:
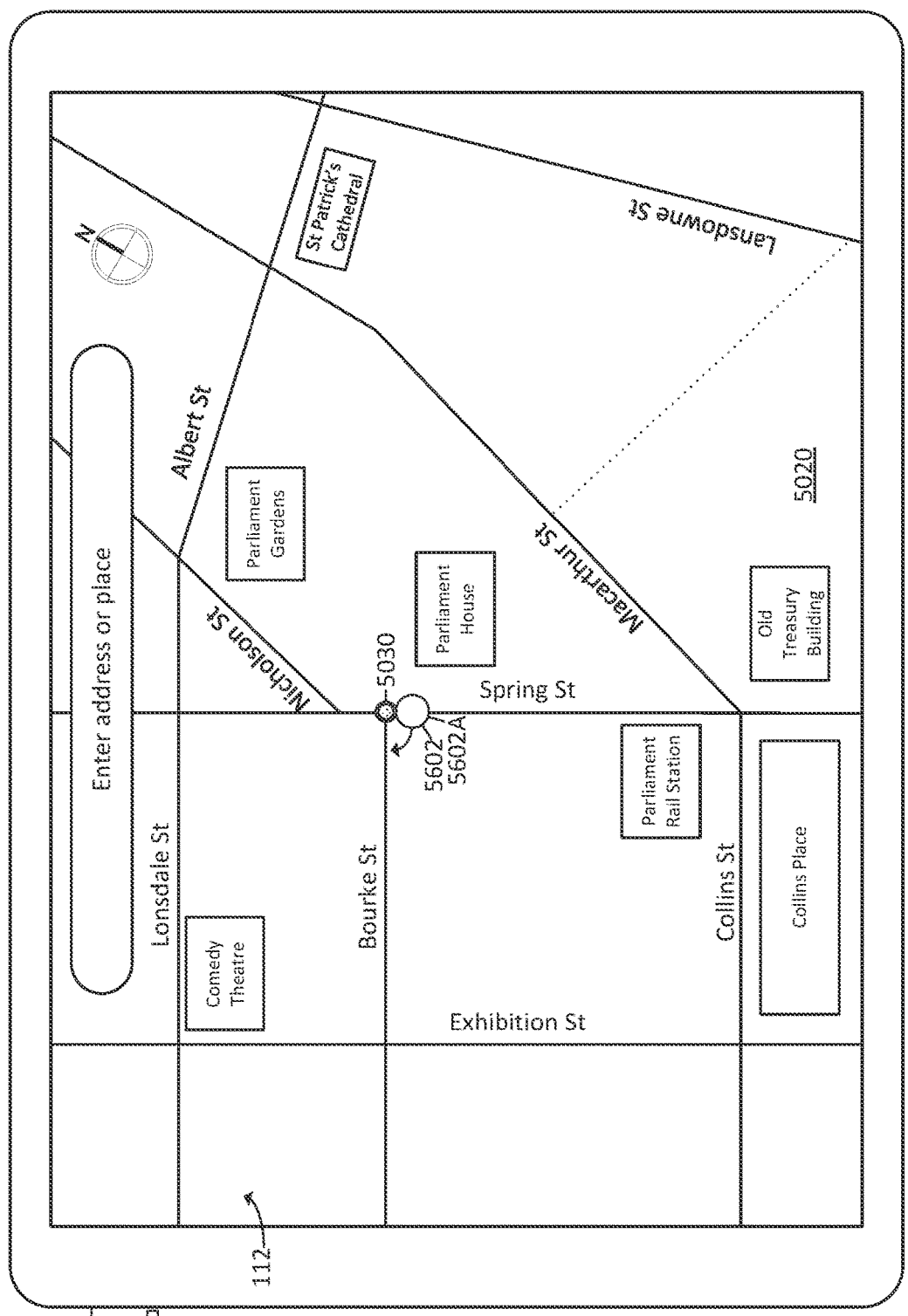

Device 100, in response to detecting the user's input to select a direction of navigation from the starting location, also provides an audio of traversal information about traveling along the path from the starting location (e.g., the three-way intersection between Bourke Street and Spring Street of FIG. 6E) to the ending location (e.g., the four-way intersection between Spring Street, Macarthur Street, and Collins Street). As used herein, traversal information includes information about traveling along the path, such as Spring Street heading southeast from three-way intersection between Bourke Street and Spring Street to the four-way intersection between Spring Street, Macarthur Street, and Collins Street. Examples of traversal information include, but are not limited to, distance between the starting location and the ending location, points of interest along or near the path (e.g., Parliament House, Parliament Rail Station, etc.) from the starting location to the ending location, events occurring along or near the path, the elevation change between the starting location and the ending location, hazards along or near the path, information about the curvature of the path (e.g., Macarthur Street heading south from the four-way intersection between Albert Street and Macarthur Street veers right) as well as other information about traversing the path. For example, device 100, in the embodiment of FIGS. 6D-6E, detects a tap gesture with contact 5506 over Spring Street heading southeast (the direction of navigation) from the three-way intersection between Bourke Street and Spring Street (the starting location), and in response to detecting the tap gesture, provides an audio that taking Spring Street southeast from the intersection of Spring Street and Bourke Street leads the user to a four-way intersection between Spring Street, Macarthur Street, and Collins Street (ending location). The audio also informs the user that the user will pass Parliament House and Parliament Rail Station (points of interest) while traveling southeast on Spring Street. Additional examples of audios of traversal information are described in the paragraphs below and are illustrated in at least FIGS. 6F-6G, 6I-6K, 6M-6P, and 6R. In some embodiments, where the user is visually impaired, audio of the traversal information about traveling along the path helps the user explore the path and the nearby area without having to visually comprehend the digital map.

In some embodiments, the level of detail (verbosity setting) of the description of the traversal information is adjustable. In one or more embodiments, where the verbosity setting is set at a low level, audio of the description of the traversal information only includes the street name of the path. In one or more of such embodiments, where the verbosity setting is set at a medium level, the audio also includes information about hazards along the path. In one or more of such embodiments, where the verbosity setting is set at a high level, the audio also includes information about points of interest along the path as well as nearby points of interest and events. In one or more embodiments, the verbosity setting is user-customizable. For example, the user customizes the verbosity setting to receive audio about nearby hazards that impact pedestrians, but not about nearby hazards that only impact vehicle traffic.

In some embodiments, the user, after receiving an audio about traveling along a path (e.g., Spring Street heading southeast from the three-way intersection between Bourke Street and Spring Street) from a starting location (e.g., the three-way intersection between Bourke Street and Spring Street) to an ending location (e.g., the four-way intersection between Spring Street, MacArthur Street, and Collins Street), enters user inputs to explore traveling from the starting location to other locations of the geographic region. In one or more embodiments, device 100, in response to determining a new direction of navigation from the starting location, determines a path from the starting location and in the new direction of navigation, and provides an audio of traversal information along the path.

Figure 6F:
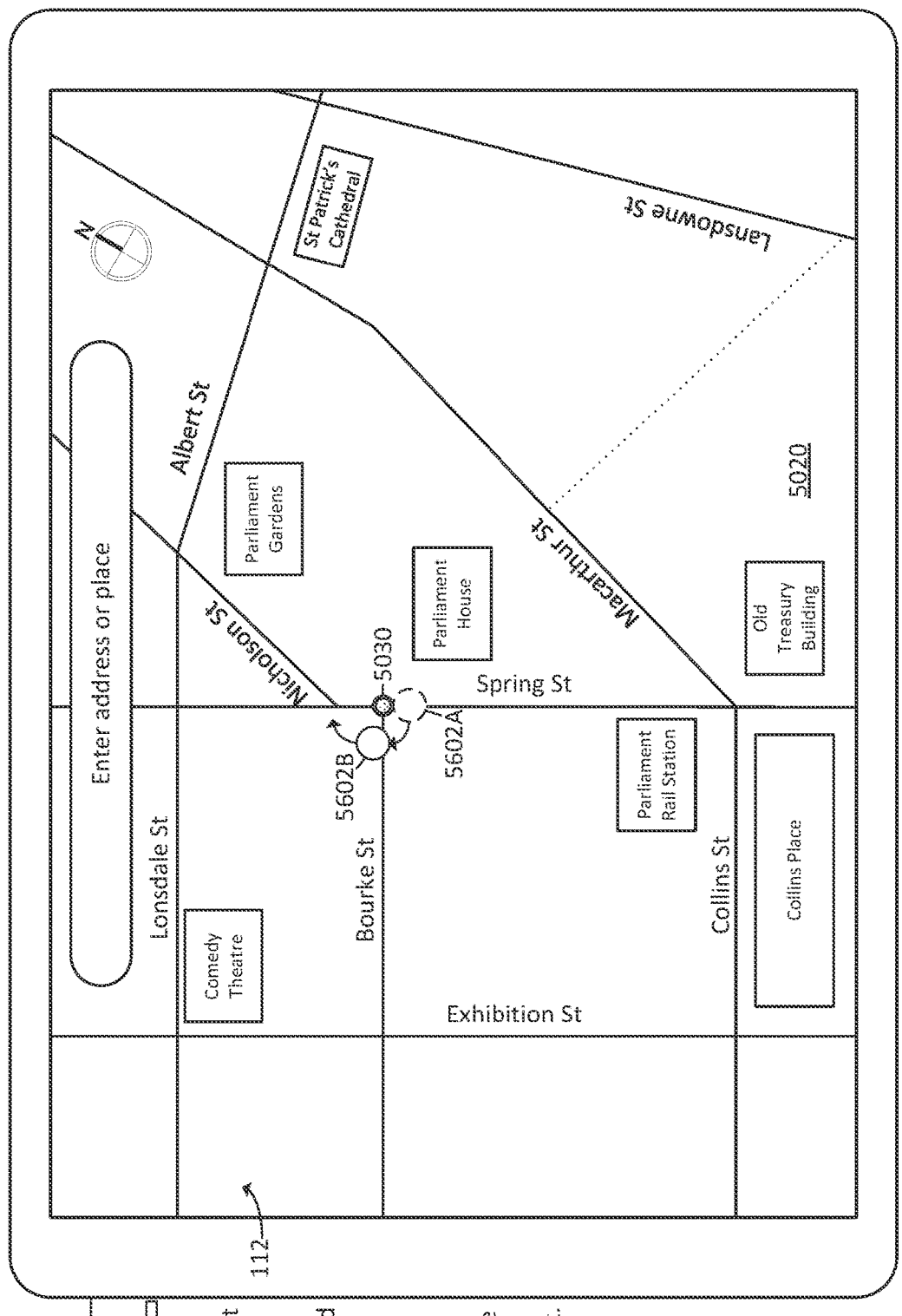
Figure 6G:
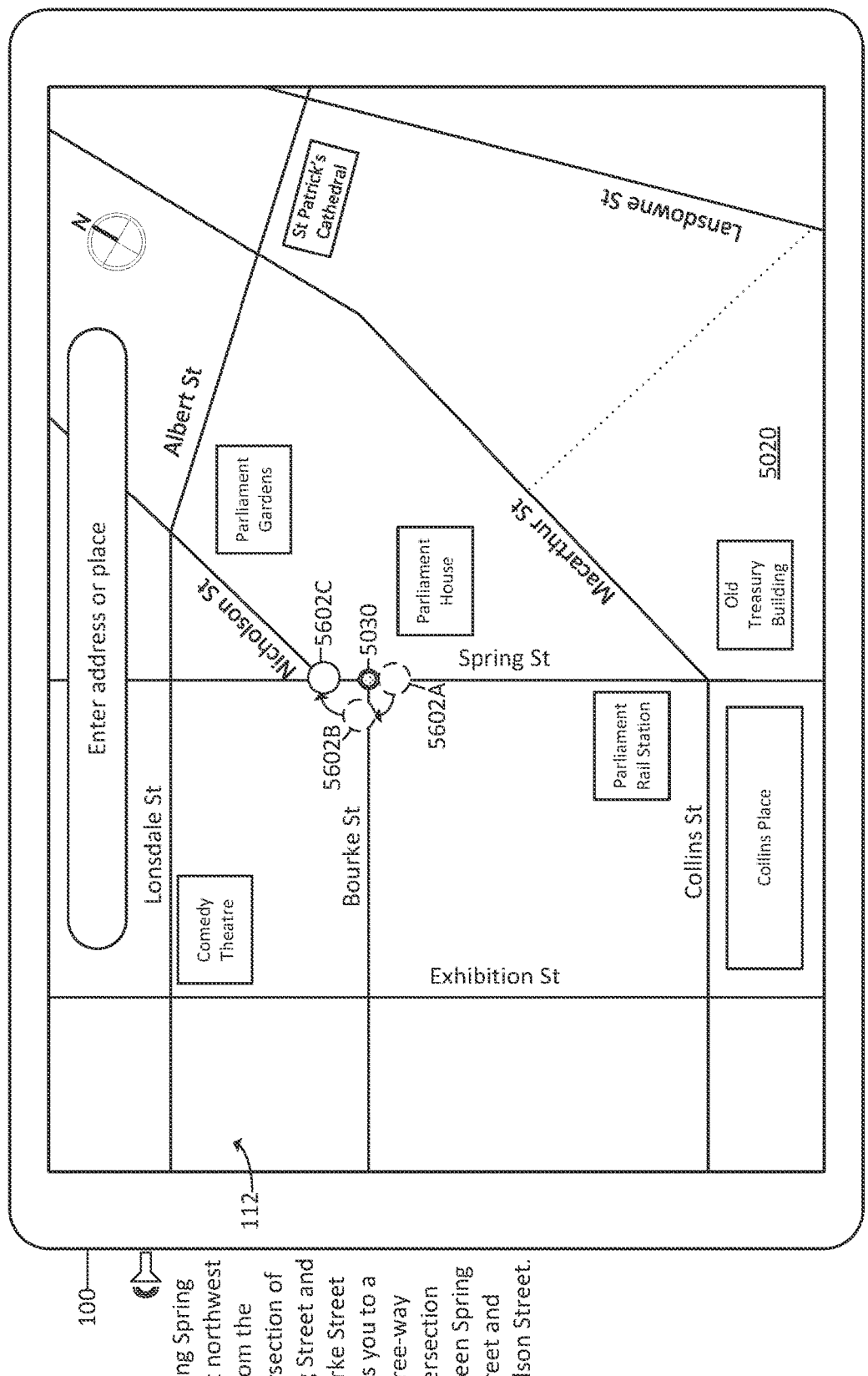

FIGS. 6E-6G illustrate detecting a semi-circular drag gesture around the starting location (the three-way intersection between Bourke Street and Spring Street). More particularly, FIGS. 6E-6F illustrate detecting the drag gesture with contact 5602 from position 5602A over Spring Street heading southwest from the starting location to position 5602B over an area of the digital map near Bourke Street heading southwest from the starting location. In the illustrated embodiment of FIGS. 6E-6F, device 100, in response to detecting the drag gesture, determines that Bourke Street heading southwest (the path) from the starting location is in the direction of navigation and would lead the user to a four-way intersection between Bourke Street and Exhibition Street (the ending location). Device 100 then provides audio that taking Bourke Street southwest from the intersection of Spring Street and Bourke Street leads the user to a four-way intersection between Bourke Street and Exhibition Street. In the illustrated embodiment of FIGS. 6E-6F, device 100 also determines that the user would pass under an overpass while traveling on Bourke Street southwest from the starting location and provides an audio that the user will pass under an overpass while traveling southwest on Bourke Street. In one or more embodiments, device 100 also determines other traversal information about traveling along Bourke Street (e.g., distance to the next intersection, elevation change from the starting location to the next intersection, points of interest along the path, hazards along the path, as well as other relevant information about traveling along Bourke Street) and heading southwest from the starting location.

FIGS. 6F-6G illustrate displaying a continuation of the drag gesture with contact 5602 illustrated in FIGS. 6E-6F. More particularly, FIGS. 6F-6G illustrate detecting the drag gesture with contact 5602 from position 5602B over an area of the digital map near Bourke Street heading southwest from intersection of Spring Street and Bourke Street to position 5602C over a three-way intersection between Nicholson Street and Spring Street.

In the illustrated embodiment of FIGS. 6F-6G, device 100, in response to detecting the drag gesture, determines that Spring Street heading northwest (the path) from the intersection of Bourke Street and Spring Street (the starting location) is in the direction of navigation and would lead the user to the three-way intersection between Spring Street and Nicholson Street (the ending location). Device 100 then provides audio that taking Spring Street northwest from the intersection of Spring Street and Bourke Street leads the user to a three-way intersection between Spring Street and Nicholson Street. In some embodiments, device 100 also determines other traversal information about traveling along Bourke Street heading southwest (e.g., distance to the next intersection, elevation change from the starting location to the next intersection, points of interest along the path, hazards along the path, as well as other relevant information about traveling on Bourke Street), and provides an audio of the additional traversal information to the user.

In some embodiments, the user, after receiving traversal information about traveling along a path (e.g., Spring Street heading northwest from the intersection of Spring Street and Bourke Street), enters user inputs to continue to explore the geographic region. In some embodiments, the user performs a double tap gesture over a location along the path (e.g., over the next intersection along the path) to designate the location as a new starting location. In one or more embodiments, the user performs a swipe gesture for a threshold distance along a path (e.g., a swipe gesture along Spring Street heading northwest from the intersection of Spring Street and Bourke Street for at least one inch, two inches, half of the length of the path between the starting location and the ending location, or another threshold distance) to designate the next intersection along the path as the new starting location. In one or more embodiments, the user performs a swipe gesture for a threshold distance along a path to designate the ending location (e.g., the three-way intersection between Nicholson Street and Spring Street) as the new starting location. In one or more embodiments, where the user performs a swipe gesture for a threshold distance along a path, an intersection along the path that is closest to the ending location of the swipe gesture is designated as the new starting location. In one or more embodiments, the user provides an audio command (e.g., "designate the three-way intersection of Spring Street and Nicholson Street as a new starting location") to device 100 to designate a new starting location. In one or more embodiments, the user enters a new starting location or a description of the new starting location in a search bar 5021 (e.g., "three-way intersection between Spring Street and Nicholson Street" etc.) of FIG. 6B to select the new starting location.

In some embodiments, where a drag gesture bisects multiple thoroughfares that are connected to the starting location (or the new starting location), device 100 provides an audio of the street names of each thoroughfare that is bisected by the drag gesture in the order the thoroughfares are bisected by the drag gesture. In one or more embodiments, device 100 also provides an audio of traversal information about traveling along the thoroughfares that are bisected by the drag gesture. In the embodiment of FIGS. 6E-6G, the drag gesture moves from position 5602A over Spring Street heading southeast from the three-way intersection between Spring Street and Bourke Street (the starting location), to position 5602B over an area near Bourke Street heading southwest from the starting location, to position 5602C over Spring Street heading northwest from the starting location, and bisects two thoroughfares that are connected to the starting location. In the illustrated embodiment of FIGS. 6E-6G, device 100 provides audios of the street names of the thoroughfares (Bourke Street and Spring Street) in the order the thoroughfares are bisected by the drag gesture as well as traversal information about traveling along the thoroughfares in the order the thoroughfares are bisected by the drag gesture. In some embodiments, where the user continues to perform the drag gesture illustrated in FIGS. 6E-6G around the starting location, the drag gesture forms a loop around the starting location and bisects Spring Street heading southeast from the starting location. In one or more embodiments, device 100, after determining that the drag gesture has bisected Spring Street heading southeast, provides an audio of the street name and traversal information about traveling along Spring Street heading southeast from the starting location. In some embodiments, device 100, after determining that the current position of the drag gesture is closest to Spring Street heading southeast from the starting location relative to other thoroughfares that are connected to the starting location (e.g., Bourke Street heading southwest and Spring Street heading northwest), provides an audio of the street name and traversal information about traveling along Spring Street heading southeast from the starting location.

Figure 6H:
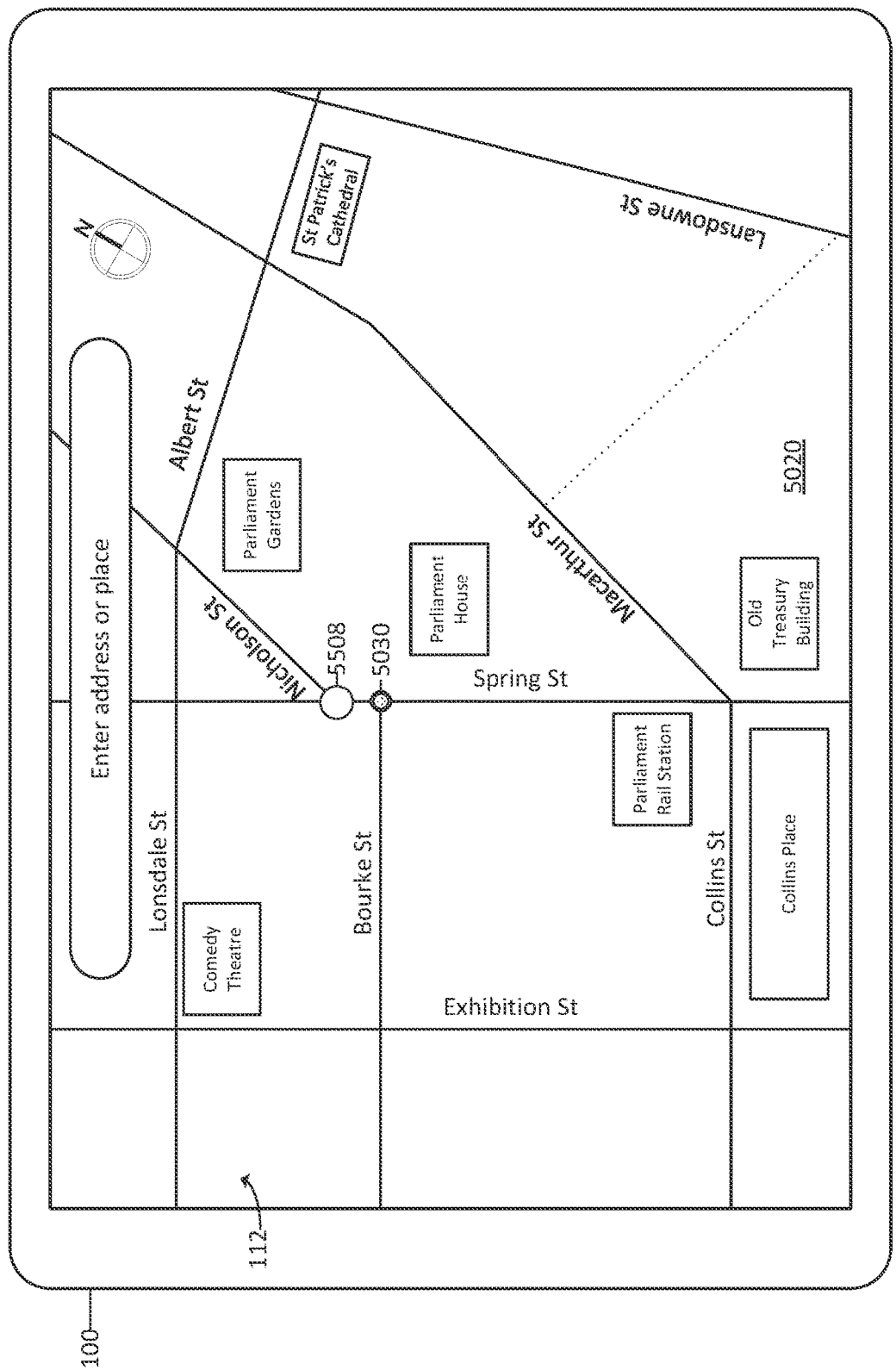
Figure 6I:
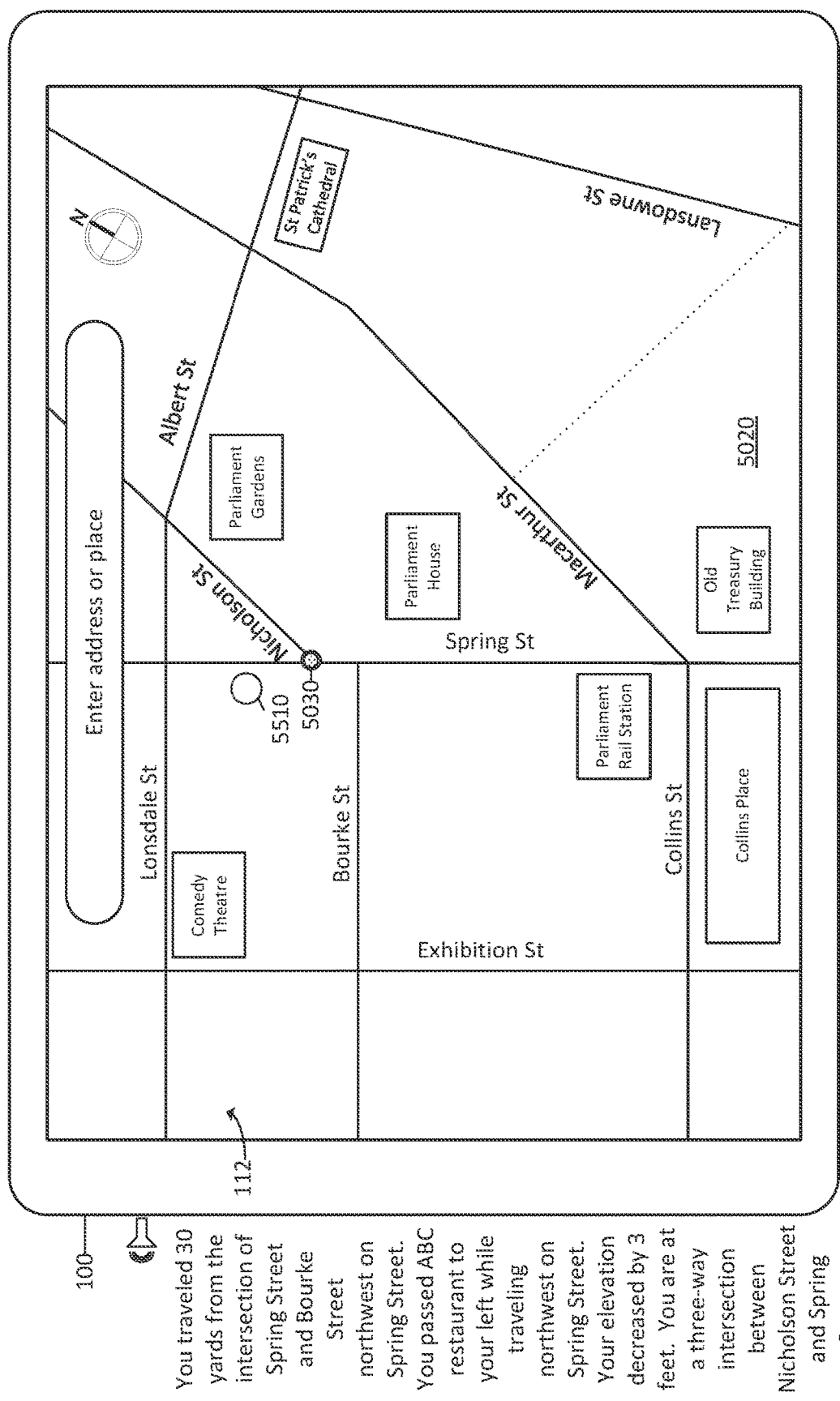

FIGS. 6H-6I illustrate detecting a double tap gesture with contact 5508 over the three-way intersection of Spring Street and Nicholson Street to select a new starting location, and in response to detecting the double tap gesture, displaying starting location indicator 5030 around the three-way intersection between Nicholson Street and Spring Street. In the illustrated embodiment of FIGS. 6H-6I, device 100, in response to detecting the double tap gesture, provides traversal information about traveling from the previous starting location (the three-way intersection between Spring Street and Bourke Street) to the new starting location (the three-way intersection between Nicholson Street and Spring Street). Device 100 then provides an audio containing traversal information about what the user has passed while traveling along Spring Street heading northwest (the path) from the three-way intersection between Spring Street and Bourke Street to the three-way intersection between Nicholson Street and Spring Street. In the illustrated embodiment of FIG. 6I, traversal information about traveling along Spring Street heading northwest includes information that the user traveled 30 yards from the intersection of Spring Street and Bourke Street and that the user passed by ABC restaurant (a point of interest) to the user's left while traveling northwest on Spring Street. Further, the traversal information also includes an elevation change (three feet decrease) from the three-way intersection between Spring Street and Bourke Street to the three-way intersection between Nicholson Street and Spring Street. In some embodiments, device 100 also determines other relevant traversal information about traveling along Spring Street northwest and provides an audio of the additional traversal information to the user.

In some embodiments, the user, after designating a new starting location (e.g., the three-way intersection between Nicholson Street and Spring Street of FIGS. 6I-6L), enters one or more inputs to designate a previous starting location (e.g., the three-way intersection between Bourke Street and Spring Street of FIGS. 6D-6H) as the new starting location. Examples of user inputs to designate a previous starting location as the new starting location include double tapping over the previous starting location, providing a voice command to designate the previous starting location as the new starting location, or other suitable user inputs. In one or more of such embodiments, device 100, in response to receiving a user input to designate a previous starting location as the new starting location, displays starting location indicator 5030 around the previous starting location and provides audio that the starting location has been changed.

Figure 6J:
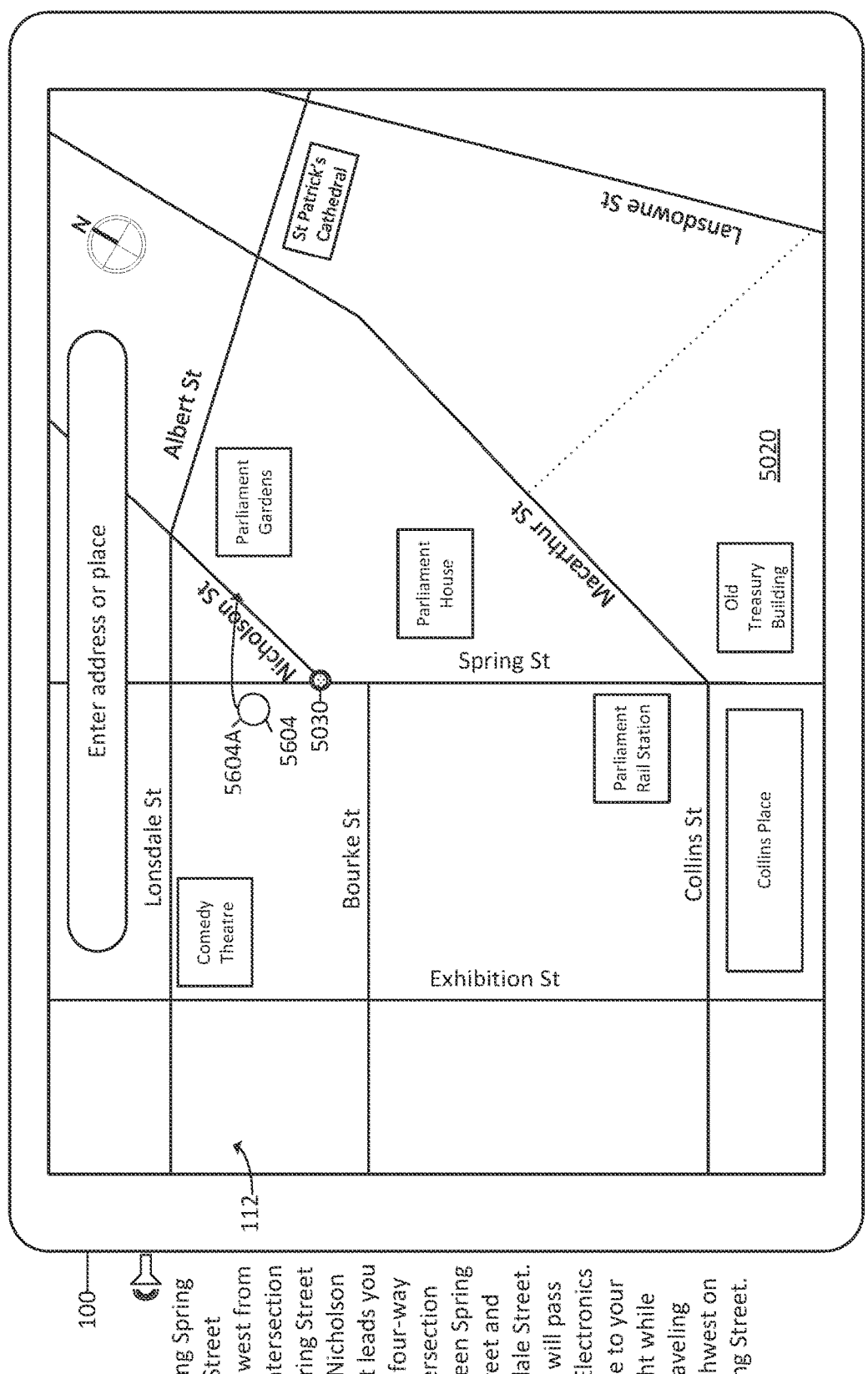

FIGS. 6I-6J illustrate detecting a tap gesture with contact 5510 over an area of the digital map near Spring Street heading northwest (the direction of navigation) from the three-way intersection between Nicholson Street and Spring Street (the new starting location), and in response to detecting the tap gesture, determining that the four-way intersection between Spring Street and Lonsdale Street, which is the next intersection from the three-way intersection between Bourke Street and Spring Street and in the direction of navigation, as the ending location. Further, device 100, in response to detecting the tap gesture illustrated in FIG. 6I, provides audio of traversal information about traveling along Spring Street heading northwest from the new starting location. In the illustrated embodiment of FIG. 6J, the audio informs the user that taking Spring Street northwest from the intersection of Spring Street and Nicholson Street leads the user to a four-way intersection between Spring Street and Lonsdale Street (the next intersection along the path). The traversal information also informs the user that the user will pass a point of interest (DEF Electronics Store to the user's right) while traveling northwest on Spring Street.

Figure 6K:
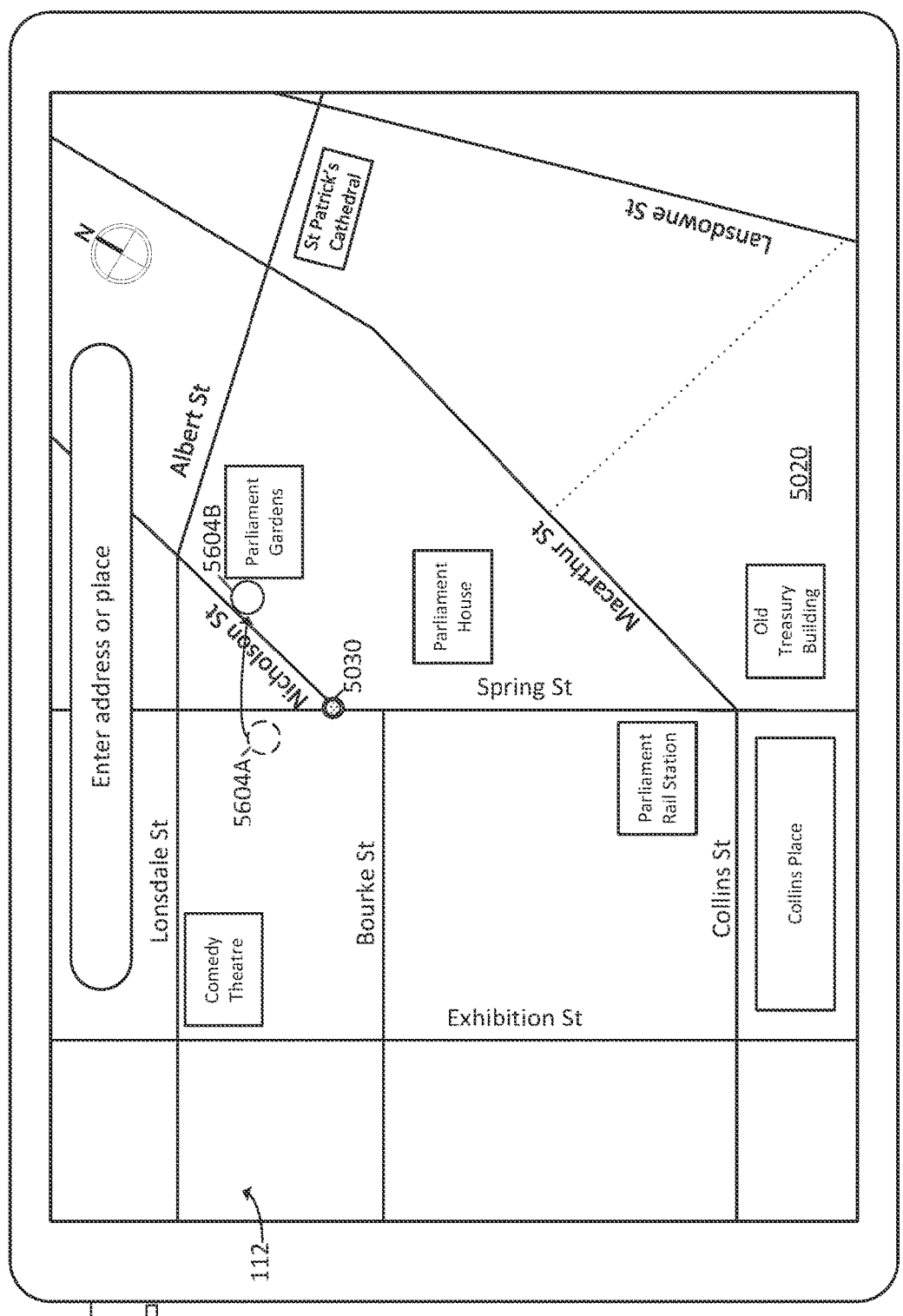

FIGS. 6J-6K illustrate detecting the drag gesture with contact 5604 from position 5604A over an area near Spring Street heading northwest from the intersection of Spring Street and Nicholson Street (the new starting location) to position 5604B over an area of the digital map near Nicholson Street heading north from the intersection of Nicholson Street and Spring Street. In the illustrated embodiment of FIGS. 6J-6K, the direction of navigation (north) is in the cardinal direction of the thoroughfare (Nicholson Street) that is connected to the new starting location and is heading away from the new starting location. Device 100, in response to detecting the drag gesture illustrated in FIGS. 6J-6K, determines the direction of navigation, and provides an audio of traversal information about traveling north on Nicholson Street from the new starting location. In the illustrated embodiment of FIG. 6K, the audio informs the user that taking Nicholson Street north from the intersection of Nicholson Street and Spring Street leads the user to a four-way intersection between Nicholson Street, Albert Street and Lonsdale Street, which is the next intersection along Nicholson Street heading north from the current starting location.

Figure 6L:
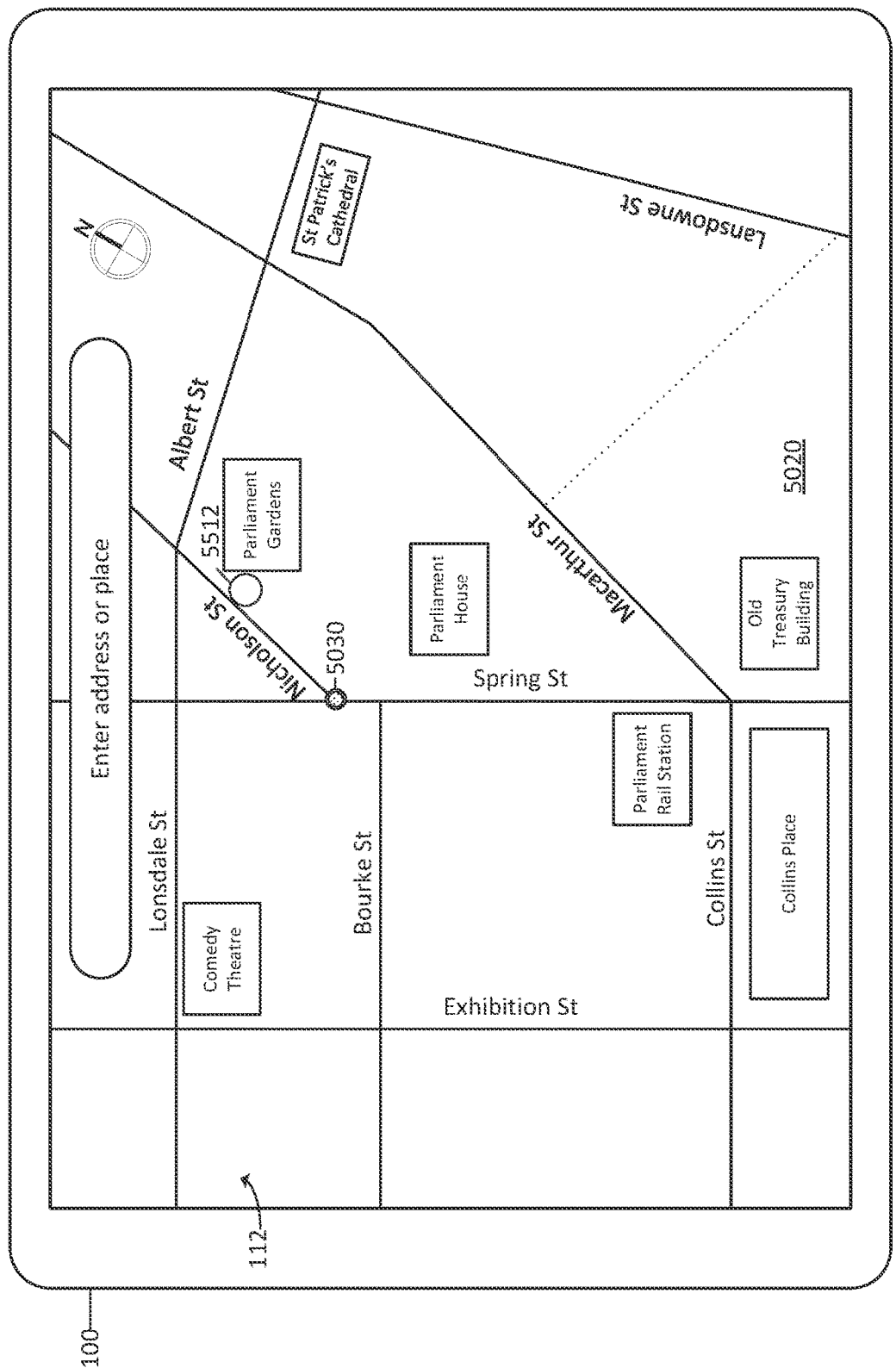

FIGS. 6L-6M illustrate detecting a double tap gesture with contact 5512 over an area of the digital map near Nicholson Street heading north from the three-way intersection between Spring Street and Nicholson Street, and in response to detecting the double tap gesture, displaying starting location indicator 5030 around a four-way intersection between Lonsdale Street, Nicholson Street, and Albert Street (new starting location). In the illustrated embodiment of FIGS. 6L-6M, device 100, in response to detecting the double tap gesture, provides traversal information about traveling from the previous starting location (the three-way intersection between Spring Street and Nicholson Street) to the new starting location. Device 100 then provides an audio of traversal information about what the user has passed while traveling along Nicholson Street heading north (the path) from the three-way intersection between Spring Street and Nicholson Street to the four-way intersection between Lonsdale Street, Nicholson Street, and Albert Street. In the illustrated embodiment, the audio informs the user that the user traveled 100 yards on Nicholson Street heading north from the three-way intersection between Spring Street and Nicholson Street. Further, the audio also informs the user that the user passed by Parliament Gardens (a point of interest) while traveling north on Nicholson Street. Further, the audio also informs the user about an ongoing event (concert by XYZ band) that is occurring near the path (in Parliament Gardens). Further, the audio also informs the user that the elevation increased by two feet while traveling from the three-way intersection between Spring Street and Bourke Street to the four-way intersection between Lonsdale Street, Nicholson Street, and Albert Street.

Figure 6N:
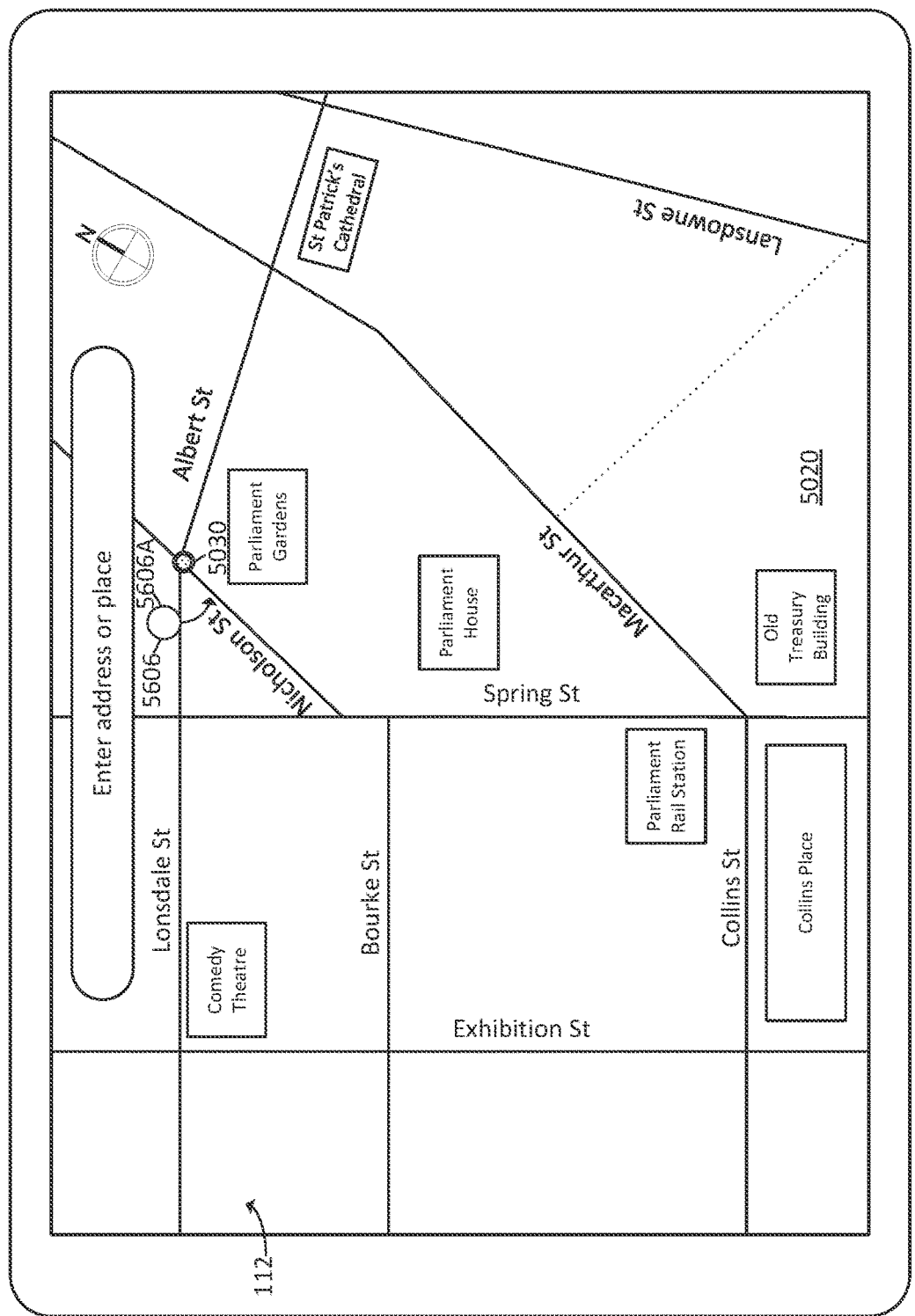
Figure 60:
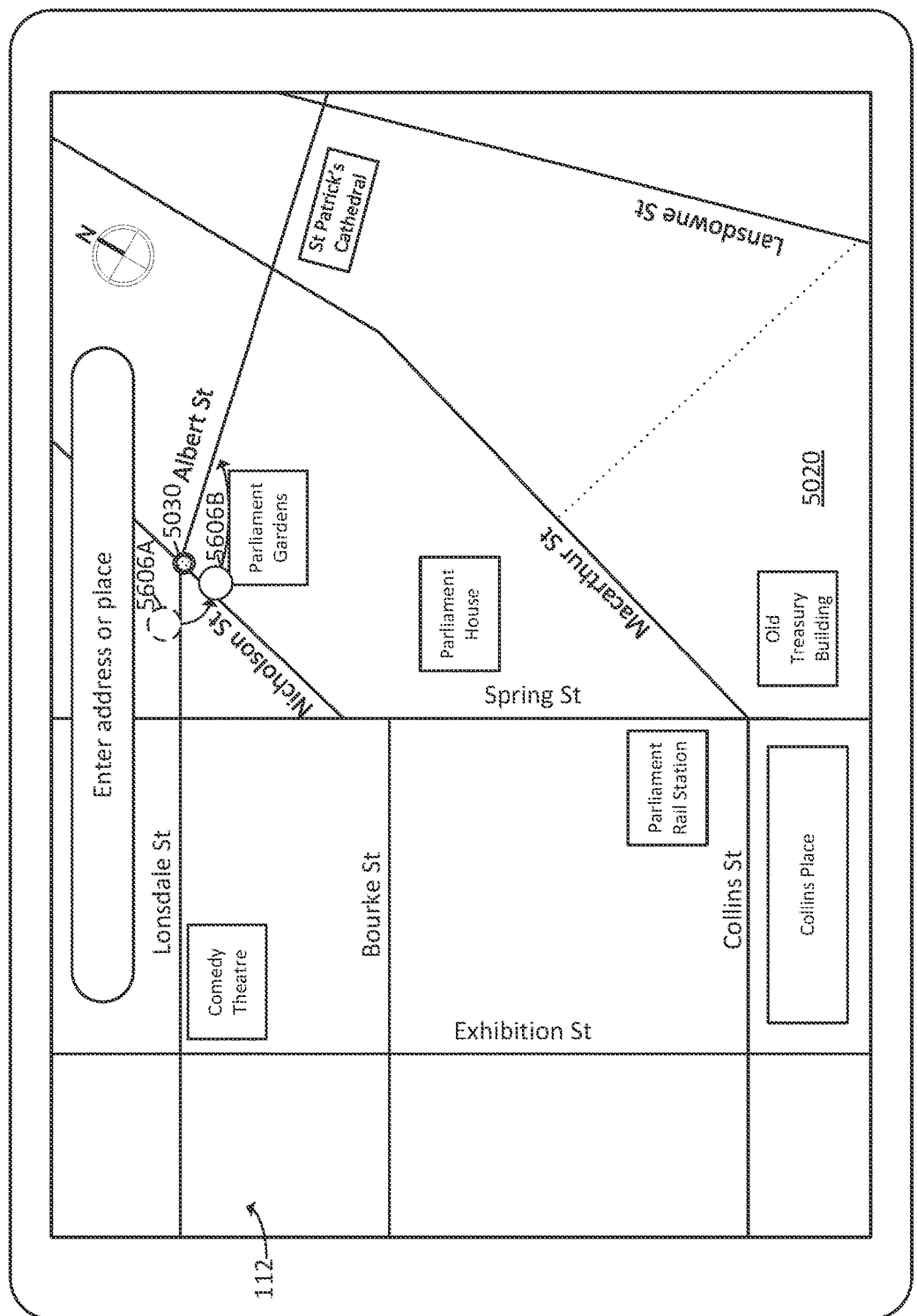

FIGS. 6M-6N illustrate detecting a tap gesture with contact 5514 over an area of the digital map near Lonsdale Street heading southwest (the direction of navigation) from the four-way intersection between Lonsdale Street, Nicholson Street, and Albert Street (the new starting location), and in response to detecting the tap gesture, providing audio that includes traversal information about traveling along Lonsdale Street heading southwest from the new starting location. More particularly, device 100, after detecting the tap gesture illustrated in FIG. 6M, determines that the direction of navigation is southwest, which is the cardinal direction of Lonsdale Street heading away from the new starting location. Device 100 also determines that the four-way intersection between Lonsdale Street and Spring Street, which is the next intersection from the new starting location and in the direction of navigation, as the ending location. Further, device 100, in response to detecting the tap gesture illustrated in FIG. 6M, provides audio of traversal information about traveling along Lonsdale Street heading southwest from the new starting location. In the illustrated embodiment of FIG. 6N, the audio informs the user that taking Lonsdale Street southwest from the four-way intersection between Lonsdale Street, Nicholson Street, and Albert Street leads the user to a four-way intersection between Lonsdale Street and Spring Street (the next intersection along the path). The traversal information also informs the user that a section of Lonsdale Street heading southwest is under maintenance and is inaccessible to pedestrians. In some embodiments, the traversal information includes other types of hazards along the path or near the path (e.g., traffic accidents, presence of debris, standing water, snow, ice, or objects along the path, etc.).

Figure 6P:
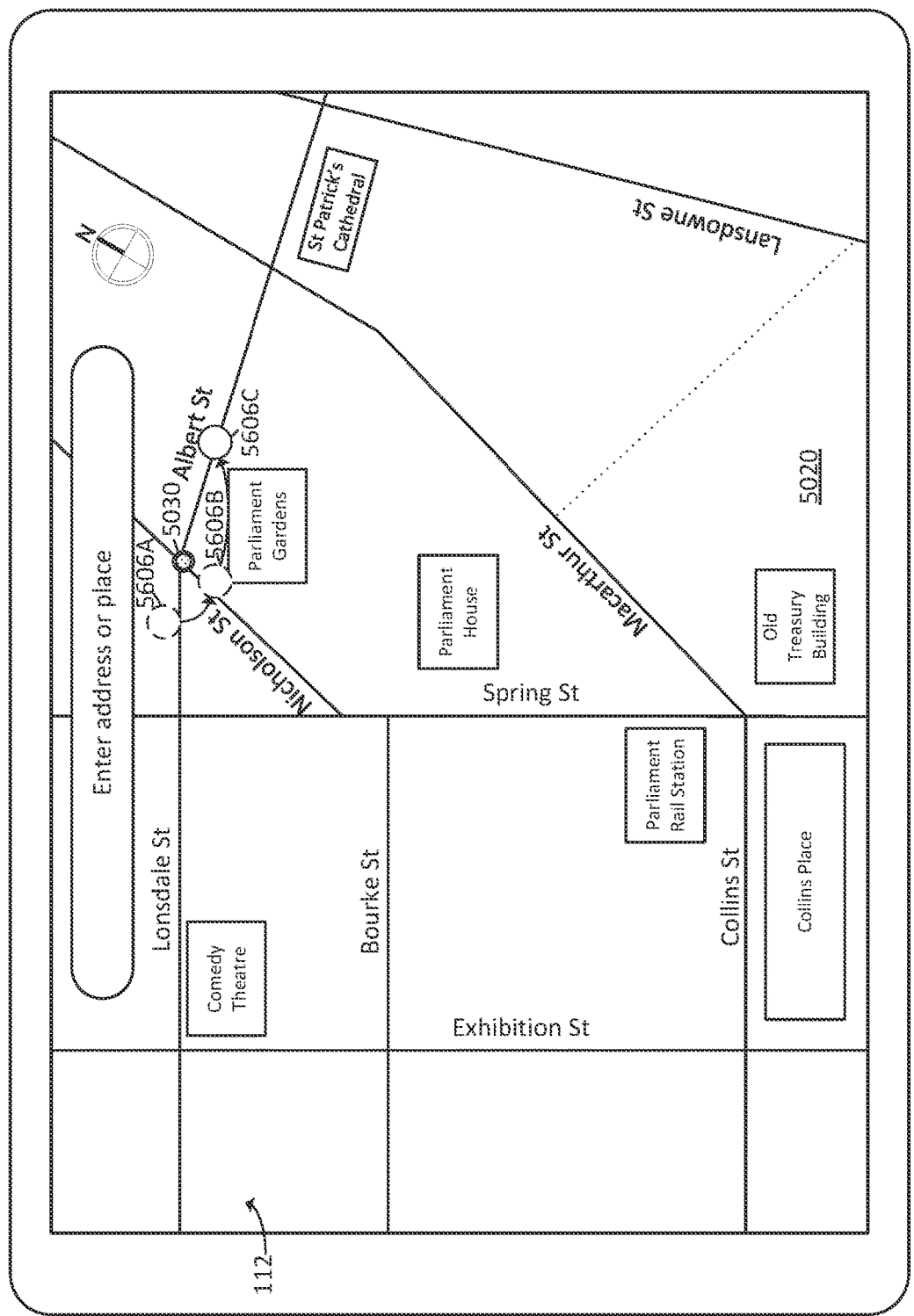

FIGS. 6N-6P illustrate detecting a semi-circular drag gesture around the four-way intersection between Lonsdale Street, Nicholson Street, and Albert Street (the new starting location). More particularly, FIGS. 6N-6O illustrate detecting the drag gesture with contact 5606 from position 5606A over an area of the digital map that is near Lonsdale Street heading southwest from the new starting location to position 5606B over an area of the digital map near Nicholson Street heading south from the new starting location. In the illustrated embodiment of FIGS. 6N-6O, device 100, in response to detecting the drag gesture, determines that Nicholson Street heading south from the new starting location (the path) is in the direction of navigation and would lead the user to a three-way intersection between Nicholson Street and Spring Street (the ending location). Device 100 then provides an audio of traversal information to inform the user that taking Nicholson Street south from the four-way intersection between Lonsdale Street, Nicholson Street, and Albert Street leads the user to a three-way intersection between Nicholson Street and Spring Street. In the illustrated embodiment, the audio also informs the user that the user will pass Parliament Gardens (a point of interest) while traveling south on Nicholson Street from the new starting location and that a concert by XYZ band (an event) is currently ongoing at Parliament Gardens.

FIGS. 6O-6P illustrate displaying a continuation of the drag gesture with contact 5606 illustrated in FIGS. 6N-6O. More particularly, FIGS. 6O-6P illustrate detecting the drag gesture with contact 5606 from position 5602B over an area of the digital map near Nicholson Street heading south from the four-way intersection between Lonsdale Street, Nicholson Street, and Albert Street (the new starting location) to position 5606C over Albert Street heading east from the new starting location. In the illustrated embodiment of FIGS. 6O-6P, device 100, in response to detecting the drag gesture, determines that Albert Street heading east (the path) is in the direction of navigation from the new starting location and would lead the user to a four-way intersection between Albert Street and Macarthur Street (the ending location). Device 100 then provides an audio that taking Albert Street east from the four-way intersection between Lonsdale Street, Nicholson Street, and Albert Street leads the user to a four-way intersection between Albert Street and Macarthur Street.

Figure 6Q:
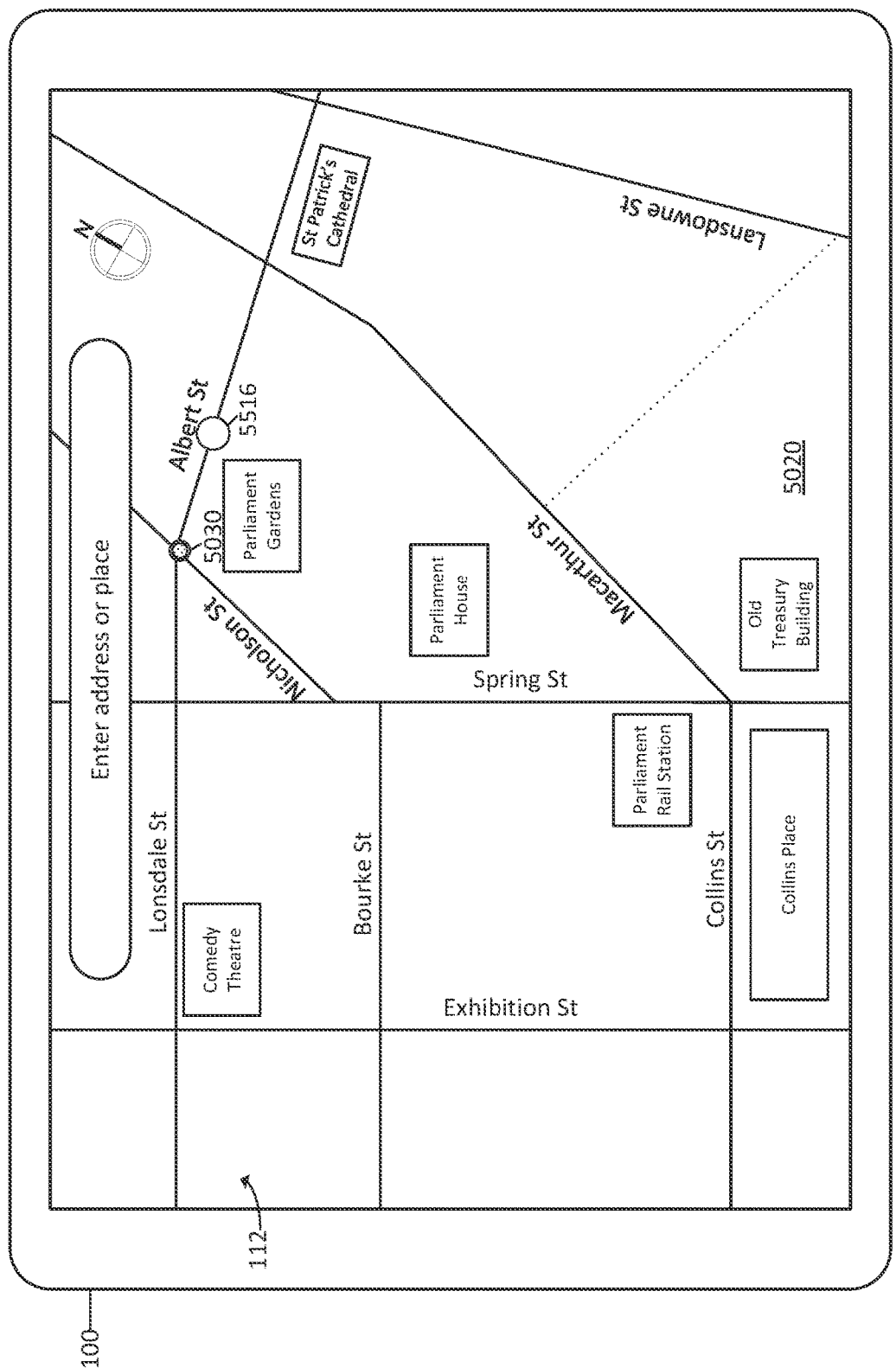
Figure 6R:
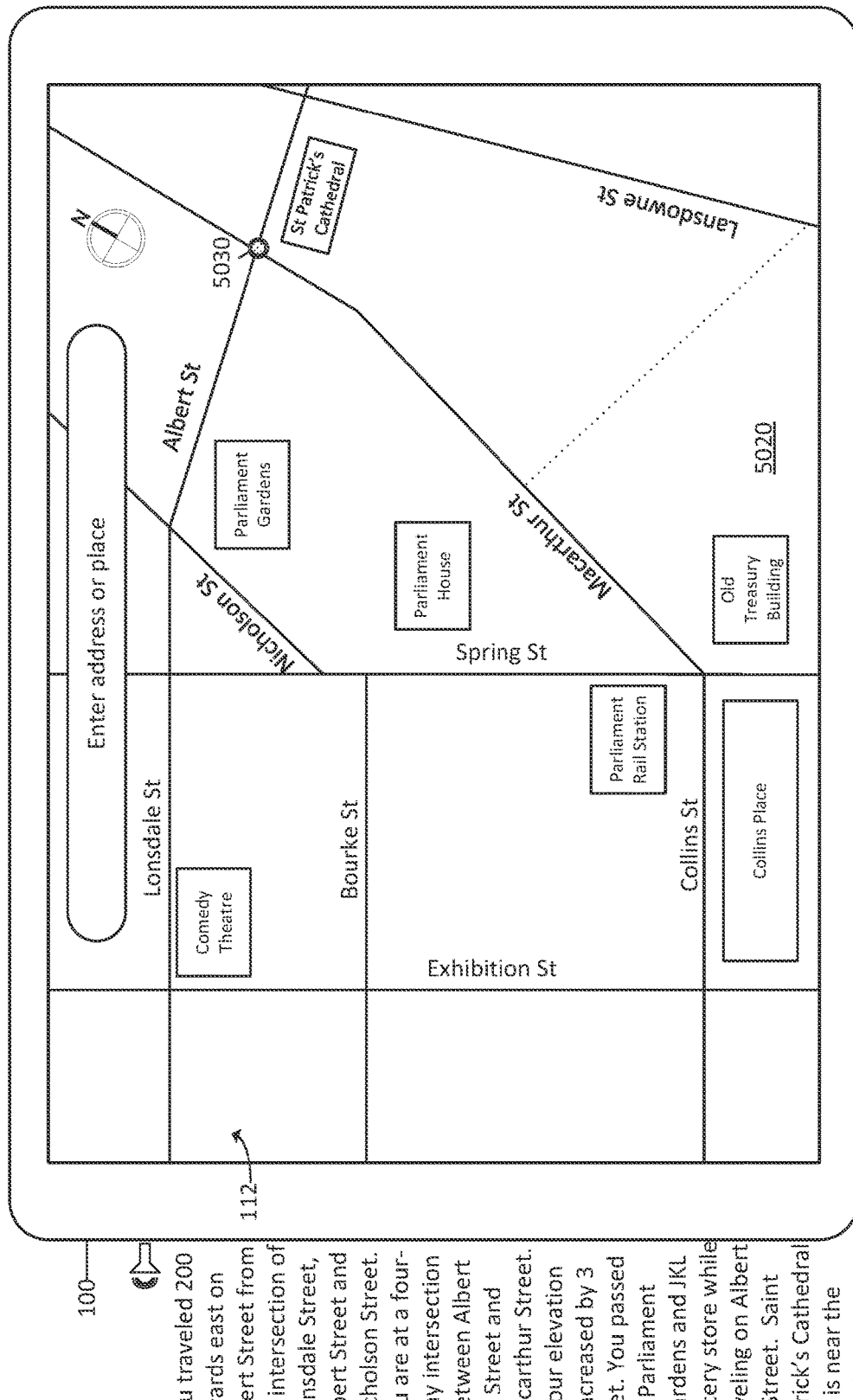
Figure 7A:
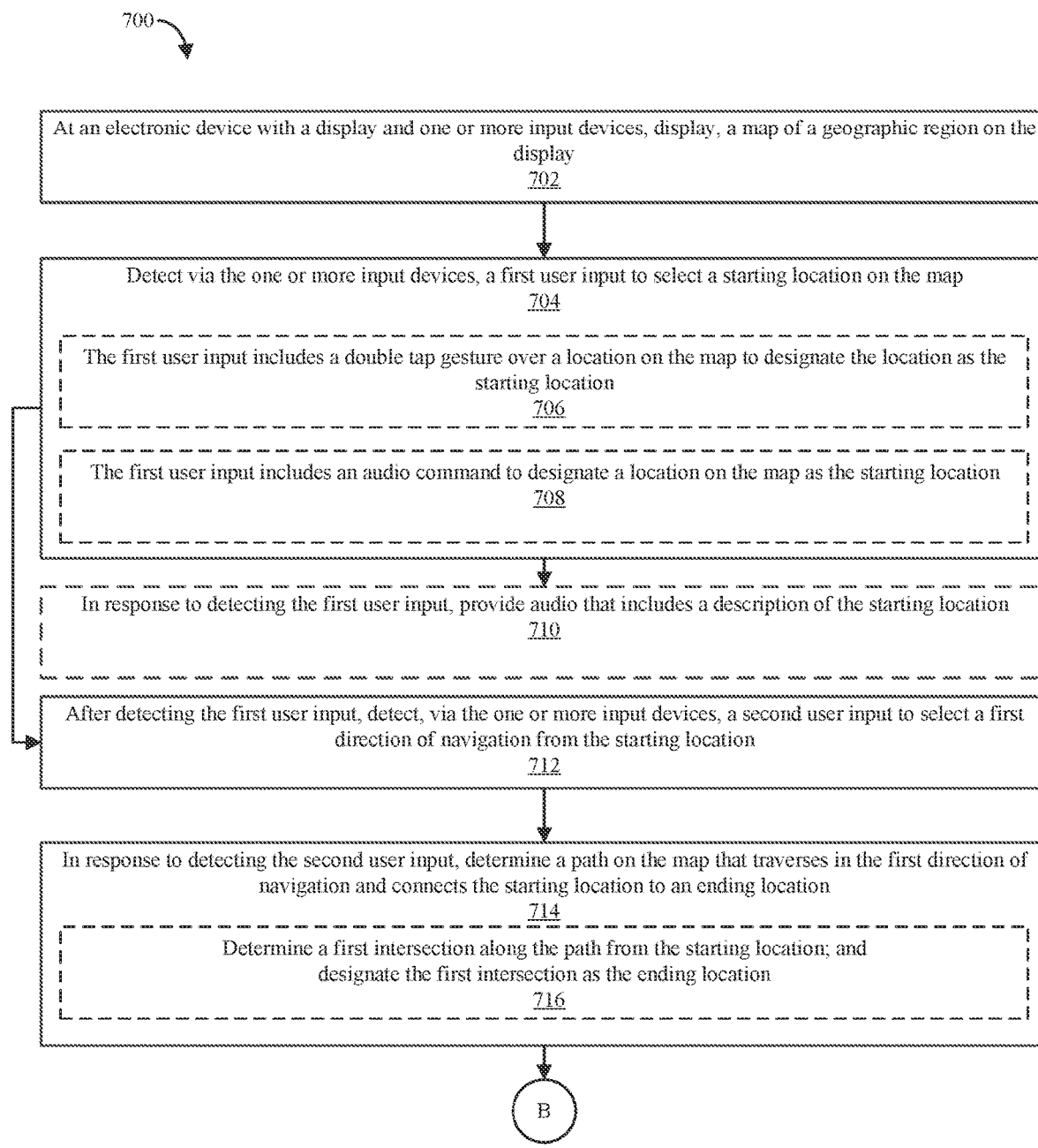
Figure 7C:
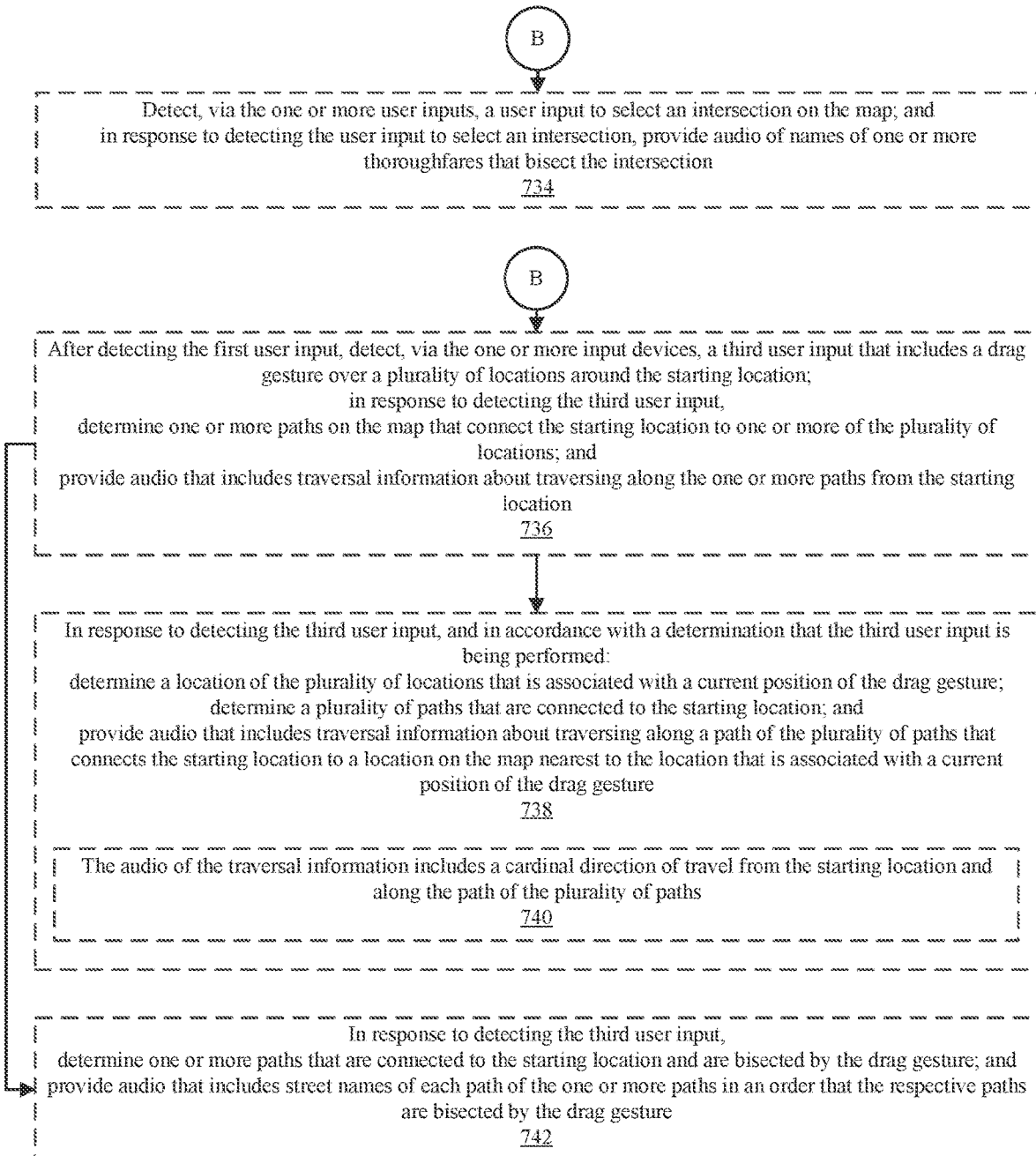
Figure 7D:
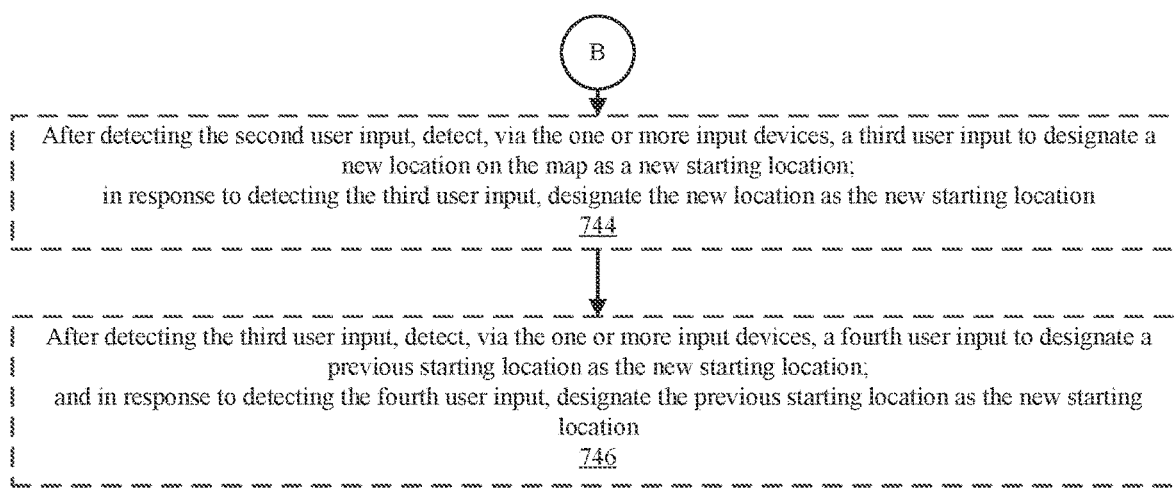

FIGS. 6Q-6R illustrate detecting a double tap gesture with contact 5516 with contact over Albert Street heading west from the four-way intersection between Lonsdale Street, Nicholson Street, and Albert Street, and in response to detecting the double tap gesture, displaying starting location indicator 5030 around a four-way intersection between Albert Street and Macarthur Street. In the illustrated embodiment of FIGS. 6Q-6R, device 100, in response to detecting the double tap gesture, provides traversal information about what the user has passed while traveling along Albert Street heading east (the path) from the four-way intersection between Lonsdale Street, Nicholson Street, and Albert Street (the previous starting location) to the four-way intersection between Albert Street and Macarthur Street (the new starting location). In the illustrated embodiment, the audio informs the user that the user traveled 200 yards from the four-way intersection between Lonsdale Street, Nicholson Street, and Albert Street. Further, the audio also informs the user that the user passed by Parliament Gardens and JKL grocery store (points of interest) while traveling east on Albert Street. Further, the audio also informs the user that St. Patrick's Cathedral (a point of interest) is near the southeast corner of the four-way intersection between Albert Street and Macarthur Street. Further, the audio also informs the user that the elevation increased by three feet while traveling from the four-way intersection between Lonsdale Street, Nicholson Street, and Albert Street to the four-way intersection between Albert Street and Macarthur Street.

In some embodiments, the user performs gestures illustrated in FIGS. 6C-6R or enters other inputs to continue to explore the geographic region. In such embodiments, device 100, in response to detecting the user inputs, provides audios of traversal information about other paths that traverse the geographic region. In some embodiments, device 100 stores some or all of the traversal information along the path(s) the user explored. In one or more embodiments, the user accesses the stored traversal information to receive traversal information about path(s) previously explored by the user.

FIGS. 7A-7D are flow diagrams illustrating various embodiments of a method for exploring a geographic region. More particularly, FIGS. 7A-7D are flow diagrams illustrating a method for exploring a geographic region, using, for example, the user interfaces of FIGS. 6A-6R. As described in reference to FIGS. 6A-6R, method 700 can be utilized to display user interfaces for exploring a geographic region. Method 700 is performed at a device (e.g., device 100, 300, 500 illustrated in FIGS. 1, 3, and 5A, respectively) with a display and one or more input devices. In one of such embodiments, the display is a touch screen display and the touch-sensitive surface is on or integrated with the display. In some embodiments, the display is separate from the touch-sensitive surface. In other embodiments, the processes described herein may be implemented with devices having physical user-interfaces, voice interfaces, or other suitable interfaces. Some operations in method 700 are, optionally, combined and/or the order of some operations is, optionally, changed.

As described below, method 700 provides an intuitive way to display user interfaces for exploring a geographic region. Method 700 allows the user to interact with user interfaces containing a digital map of a geographic region to select different locations on the digital map. After the user has selected a starting location and a direction of navigation from the starting location, audio of traversal information about traveling along a path from the starting location in the direction of navigation to an ending location is provided to the user. Providing the user with an audio of the traversal information to the user allows the user to obtain the traversal information without having to visually inspect the digital map, thereby reducing the cognitive burden of the user and creating a more efficient human-machine interface. For battery-operated computing devices, enabling a user to obtain traversal information about traveling to different locations faster and more efficiently conserves power and increases the time between battery charges.

Device 100 displays (702), a map of a geographic region on the display. FIGS. 6B-6R, for example, illustrate displaying an area of Melbourne, Australia in user interface 5020 of maps application 5041.

Device 100 detects (704) via the one or more input devices, a first user input to select a starting location on the map. FIG. 6C, for example, illustrates displaying a double tap gesture with contact 5504 on display 112 to select the starting location. In one or more embodiments, the user optionally provides an audio command that includes the starting location. In further embodiments, the user optionally enters the starting position in an input field, such as search bar 5021 of FIG. 6C.

In some embodiments, the first user input includes a double tap gesture over a location on the map to designate the location as the starting location (706). FIG. 6C, for example, illustrates performing a double tap gesture with contact 5504 over the intersection of Bourke Street and Spring Street to designate the intersection as the starting location. The method allows the user to perform a simple gesture to select a starting location, thereby reducing the cognitive burden on the user and creating a more efficient human-machine interface. For battery-operated computing devices, enabling the user to select the user's starting location faster and more efficiently conserves power and increases the time between battery charges.

In some embodiments, the first user input includes an audio command to designate a location on the map as the starting location (708). In the illustrated embodiment of FIG. 6C, the user optionally provides an audio command, such as, for example, "set the intersection of Bourke Street and Spring Street as the starting location," to designate the intersection of Bourke Street and Spring Street as the starting location. The method allows the user to provide a simple audio command to select a starting location, thereby reducing the cognitive burden on the user and creating a more efficient human-machine interface. For battery-operated computing devices, enabling the user to select the user's starting location faster and more efficiently conserves power and increases the time between battery charges.

In some embodiments, device 100, in response to detecting the first user input, provides (710) audio that includes a description of the starting location. FIGS. 6C-6D, for example, illustrate detecting a double tap gesture with contact 5504 over the intersection of Bourke Street and Spring Street, and in response to detecting the double tap gesture, providing audio that the user is at a three-way intersection between Spring Street and Bourke Street. Providing a description of the starting location helps the user gain a better understanding of the starting location as well as the area surrounding the starting location while the user explores the starting location, thereby reducing the cognitive burden of the user. Providing an audio of the starting location while concurrently displaying the starting location and nearby areas allows the user to visualize the starting location while learning about the starting location, thereby also reducing the cognitive burden of the user and creating a more efficient human-machine interface. For battery-operated computing devices, enabling the user to receive useful information about the starting location faster and more efficiently conserves power and increases the time between battery charges.

Device 100, after detecting the first user input, detects (712), via the one or more input devices, a second user input to select a first direction of navigation from the starting location. FIG. 6D, for example, illustrates detecting a tap gesture with contact 5506 over a location on the digital map (Spring Street) that is southeast of the starting location (the intersection of Bourke Street and Spring Street).

Device 100, in response to detecting the second user input, determines (714) a path on the map that traverses in the first direction of navigation and connects the starting location to an ending location. FIGS. 6D, for example, illustrates detecting a tap gesture with contact 5506 over a section of Spring Street that is southeast of the starting location (the intersection of Bourke Street and Spring Street). In the illustrated embodiment, device 100, in response to detecting the tap gesture, determines that taking Spring Street southeast would take the user from the intersection of Bourke Street and Spring Street to an ending location (a four-way intersection between Spring Street, Macarthur Street, and Collins Street).

In some embodiments, device 100 determines (716) a first intersection along the path from the starting location. In some embodiments, device 100 designates (716) the first intersection as the ending location. FIGS. 6E-6F, for example, illustrate detecting a drag gesture with contact 5602 from position 5602A (over Spring Street heading southwest from the intersection of Bourke Street and Spring Street) to position 5602B (over an area of the digital map near Bourke Street heading southwest from the intersection of Spring Street and Bourke Street), and in response to the drag gesture, determining that taking Bourke Street southwest would take the user from the intersection of Bourke Street and Spring Street to a four-way intersection between Bourke Street and Exhibition Street, which is the next intersection along Bourke Street heading southwest from the intersection of Spring Street and Bourke Street. Designating the first intersection along a path from the starting location as the ending location allows the user to determine the next junction along the path, and optionally, information about the junction (e.g., the names of the streets that form the intersection, the cardinal directions of the streets that form the intersection, distance to the intersection, etc.). The foregoing allows the user to thoroughly explore the path from the starting location, thereby reducing the cognitive burden of the user. Designating the first intersection along a path from the starting location as the ending location also allows the user to receive traversal information from the starting location to the first intersection (e.g., the distance from the first starting location to the first intersection, points of interest between the starting location and the first intersection, etc.). The foregoing provides the user with useful information about traveling from the starting location to the first intersection along the path, thereby also reducing the cognitive burden of the user. For battery-operated computing devices, enabling the user to explore a geographic region faster and more efficiently conserves power and increases the time between battery charges.

Device 100, provides (718) audio that includes traversal information about traversing along the path in the geographic region in the first direction of navigation and from the starting location to the ending location. FIGS. 6D-6E, for example, illustrate detecting a tap gesture with contact 5506 over a section of Spring Street that is southeast of the starting location (the intersection of Bourke Street and Spring Street), and in response to detecting the tap gesture, providing audio that taking Spring Street southeast from the intersection of Spring Street and Bourke Street leads the user to a four-way intersection between Spring Street, Macarthur Street, and Collins Street.

In some embodiments, in response to detecting the second user input, and in accordance with a determination of at least one point of interest along the path between the starting location and the ending location, the audio of the traversal information includes audio information about at least one point of interest (720). FIGS. 6D-6E, for example, illustrate detecting a tap gesture with contact 5506 over a section of Spring Street that is southeast of the starting location (the intersection of Bourke Street and Spring Street), and in response to detecting the tap gesture, providing audio that the user will pass Parliament House to the user's left and Parliament Rail Station to the user's right while traveling southeast on Spring Street. Providing the user with audio information about points of interest along the path helps the user determine locations (e.g., stores, restaurants, cultural sites, etc.) along the path that the user is interested in exploring or visiting without having to search for the locations, thereby reducing the cognitive burden on the user and creating a more efficient human-machine interface. For battery-operated computing devices, enabling the user to receive useful information about exploring a geographic region faster and more efficiently conserves power and increases the time between battery charges.

In some embodiments, in response to detecting the second user input, and in accordance with a determination of a distance from the starting location and the ending location, the audio of the traversal information includes audio information that includes the distance (722). FIGS. 6H-6I, for example, illustrate detecting a double tap gesture with contact 5508 over a three-way intersection between Nicholson Street and Spring Street, and in response to detecting the double tap gesture, providing audio that the user traveled 30 yards from the intersection of Spring Street and Bourke Street northwest on Spring Street. Providing the user with audio information about the distance from the starting location to the ending location allows the user to determine how far the user has to travel to reach the ending location without having to search for the distance of travel, thereby reducing the cognitive burden on the user and creating a more efficient human-machine interface. For battery-operated computing devices, enabling the user to receive useful information about exploring a geographic region faster and more efficiently conserves power and increases the time between battery charges.

In some embodiments, in response to detecting the second user input, and in accordance with a determination of a distance from the starting location to a nearest intersection along the path and between the starting location and the ending location, the audio of the traversal information includes audio information about the distance from the starting location to the nearest intersection (724). FIGS. 6D-6E, for example, illustrate detecting a tap gesture with contact 5506 over a section of Spring Street that is southeast of the starting location (the intersection of Bourke Street and Spring Street), and in response to detecting the tap gesture, providing audio that taking Spring Street southeast from the intersection of Spring Street and Bourke Street leads the user to a four-way intersection between Spring Street, Macarthur Street, and Collins Street. Providing the user with audio information about the distance from the starting location to the nearest intersection allows the user to determine how far the user has to travel to reach the nearest intersection without having to search for the distance, thereby reducing the cognitive burden on the user and creating a more efficient human-machine interface. For battery-operated computing devices, enabling the user to receive useful information about exploring a geographic region faster and more efficiently conserves power and increases the time between battery charges.

In some embodiments, in response to detecting the second user input, and in accordance with a determination of at least one hazard along the path between the starting location and the ending location, the audio of the traversal information includes audio information about the at least one hazard (726). FIGS. 6M-6N, for example, illustrate detecting a tap gesture with contact 5514 over an area of the digital map near Lonsdale Street heading southwest from the intersection of Lonsdale Street, Nicholson Street, and Albert Street, and in response to the tap gesture, providing audio that a section on Lonsdale Street heading southwest is under maintenance and is inaccessible to pedestrians. Providing the user with audio information about hazards along the path allows the user to take precaution before encountering the hazards as well as plan alternative routes to avoid the hazards, thereby reducing the cognitive burden on the user and creating a more efficient human-machine interface. For battery-operated computing devices, enabling the user to receive useful information about exploring a geographic region faster and more efficiently conserves power and increases the time between battery charges.

In some embodiments, in response to detecting the second user input, and in accordance with a determination of an elevation change along the path between the starting location and the ending location, audio of the traversal information includes audio information about the elevation change (728). FIGS. 6H-6I, for example, illustrate detecting a double tap gesture with contact 5508 over a three-way intersection between Nicholson Street and Spring Street, and in response to detecting the double tap gesture, providing audio that the elevation from the intersection of Spring Street and Bourke Street to the intersection of Nicholson Street and Spring Street decreased by three feet. Providing the user with audio information about the elevation change from the starting location to the ending location allows the user to anticipate the difficulty of traversing the path, thereby reducing the cognitive burden on the user and creating a more efficient human-machine interface. For battery-operated computing devices, enabling the user to receive useful information about exploring a geographic region faster and more efficiently conserves power and increases the time between battery charges.

In some embodiments, in response to detecting the second user input, in accordance with a determination that the detail setting of the traversal information is set at a first level, audio of the traversal information comprises providing a first level of detail about traversing along the path in the geographic region from the starting location to the ending location (730). In some embodiments, in accordance with a determination that the detail setting of the traversal information is set at a second level, audio of the traversal information includes a second level of detail about traversing along the path in the geographic region from the starting location to the ending location (730). FIGS. 6H-6I, for example, illustrate detecting a double tap gesture with contact 5508 over a three-way intersection between Nicholson Street and Spring Street, and in response to detecting the double tap gesture, providing traversal information including the distance from the intersection of Spring Street and Bourke Street to the intersection of Nicholson Street and Spring Street, the elevation change between the two intersections, as well as a point of interest (ABC restaurant) along Spring Street between the two intersections. In some embodiments, the level of detail of the traversal information is based on detail setting of the application. In the illustrated embodiment of FIGS. 6H-6I, the detail setting is set at a second level. In one or more embodiments, where the double tap gesture with contact 5508 as illustrated in FIG. 6H is performed while the detail setting is set at a first level, only the distance between a starting location (e.g., intersection of Spring Street and Bourke Street) and an ending location (e.g., the intersection of Nicholson Street and Spring Street) is provided. Providing the user with multiple detail settings allows the user to select the amount of information the user would like to hear, and optionally, the type of information the user would like to hear. Moreover, providing the user with different levels of detail about traversing along the path allows the user to receive useful information without overwhelming the user, thereby reducing the cognitive burden on the user and creating a more efficient human-machine interface. For battery-operated computing devices, enabling the user to receive different levels of details of traversal information faster and more efficiently conserves power and increases the time between battery charges.

In some embodiments, in response to detecting the second user input, device 100 provides (732) an audio description of the ending location. FIGS. 6Q-6R, for example, illustrate detecting a double tap gesture with contact 5516 over Albert Street heading east from the intersection of Albert Street and Nicholson Street, and in response to detecting the double tap gesture, providing an audio description of the intersection of Albert Street and Macarthur Street (ending location). In the illustrated embodiment, the audio description of the intersection includes the street names of the streets that form the intersection, points of interest (Saint Patrick's Cathedral) around the intersection, distance from the intersection of Albert Street and Nicholson Street, and elevation change from the intersection of Albert Street and Nicholson Street. Providing the user with an audio description of the ending location provides the user with useful information (e.g., the address of the ending location, nearby points of interests, distance to the ending location, etc.) that helps the user explore the path as well as determine whether the user should select an alternative path, thereby reducing the cognitive burden of the user. For battery-operated computing devices, enabling the user to receive useful information about exploring a geographic region faster and more efficiently conserves power and increases the time between battery charges.

In some embodiments, device 100 detects (734), via the one or more user inputs, a user input to select an intersection on the map. In some embodiments, device 100, in response to detecting the user input to select an intersection, provides (734) audio of names of one or more thoroughfares that bisect the intersection. FIGS. 6H-6I, for example, illustrate detecting a double tap gesture with contact 5508 over a three-way intersection between Nicholson Street and Spring Street, and in response to detecting the double tap gesture, providing the street names of Nicholson Street and Spring Street. Providing the user with the names of thoroughfares that bisect an intersection provides the user with useful information that helps the user explore the intersection, thereby reducing the cognitive burden of the user and creating a more efficient human-machine interface. For battery-operated computing devices, enabling the user to receive useful information about exploring a geographic region faster and more efficiently conserves power and increases the time between battery charges.

In some embodiments, device 100, after detecting the first user input, detects (736), via the one or more input devices, a third user input that includes a drag gesture over a plurality of locations around the starting location. FIGS. 6E-6G, for example, illustrate detecting a drag gesture with contact 5602 from position 5602A over Spring Street heading southwest from the intersection of Bourke Street and Spring Street, to position 5602B over an area of the digital map near Bourke Street heading southwest from the intersection of Spring Street and Bourke Street, and to position 5602C over the intersection of Nicholson Street and Spring Street.

In some embodiments, device 100, in response to detecting the third user input, determines (736) one or more paths on the map that connect the starting location to one or more of the plurality of locations. In some embodiments, device 100 provides (736) audio that includes traversal information about traversing along the one or more paths from the starting location. FIGS. 6E-6F, for example, illustrate detecting a drag gesture with contact 5602 from position 5602A over Spring Street heading southwest from the intersection of Bourke Street and Spring Street to position 5602B over an area of the digital map near Bourke Street heading southwest from the intersection of Spring Street and Bourke Street, and in response to the drag gesture, providing audio that taking Bourke Street southwest would take the user from the intersection of Bourke Street and Spring Street to a four-way intersection between Bourke Street and Exhibition Street. FIGS. 6F-6G, for example, illustrate detecting a drag gesture with contact 5602 from position 5602B to position 5602C over the intersection of Nicholson Street and Spring Street, and in response to the drag gesture, providing audio that taking Spring Street northwest would take the user from the intersection of Bourke Street and Spring Street to the intersection of Nicholson Street and Spring Street. The method allows the user to perform a simple gesture to select locations that the user would like to explore, thereby reducing the cognitive burden of the user and creating a more efficient human-machine interface. The method allows the user to perform a simple gesture to select a direction of navigation, thereby also reducing the cognitive burden of the user and creating a more efficient human-machine interface. The method also provides the user with useful information about traveling along one or more paths to the one or more locations, thereby also reducing the cognitive burden of the user. For battery-operated computing devices, enabling the user to select different locations to explore faster and more efficiently conserves power and increases the time between battery charges.

In some embodiments, in response to detecting the third user input, and in accordance with a determination that the third user input is being performed, device 100 determines (738) a location of the plurality of locations that is associated with a current position of the drag gesture. FIGS. 6E-6F, for example, illustrate detecting a drag gesture with contact 5602 from position 5602A (over Spring Street heading southwest from the intersection of Bourke Street and Spring Street) to position 5602B over an area of the digital map near Bourke Street heading southwest from the intersection of Spring Street and Bourke Street. In the illustrated embodiment of FIG. 6F, position 5602B is the current position of the drag gesture.

In some embodiments, device 100 determines (738) a plurality of paths that are connected to the starting location.

FIGS. 6E-6F, for example, illustrate detecting a drag gesture with contact 5602 from position 5602A over Spring Street heading southwest from the intersection of Bourke Street and Spring Street to position 5602B over an area of the digital map near Bourke Street heading southwest from the intersection of Spring Street and Bourke Street. Device 100, in response to detecting the drag gesture illustrated in FIGS. 6E-6F, determines that Bourke Street is connected to the starting location (the intersection of Bourke Street and Spring Street). In some embodiments, device 100 also determines additional paths that are connected to the intersection of Bourke Street and Spring Street, such as Spring Street heading southeast and Spring Street heading northwest.

In some embodiments, device 100 provides (738) audio that includes traversal information about traversing along a path of the plurality of paths that connects the starting location to a location on the map nearest to the location that is associated with a current position of the drag gesture. Continuing with the foregoing example, FIG. 6F illustrates providing audio about heading southwest on Bourke Street from the intersection of Bourke Street and Spring Street (starting location). In the illustrated embodiment, Bourke Street is a path that takes the user closest to the location on the digital map that is associated with the current position of the drag gesture. The method provides the user with useful information about traveling along a path that would take the user to a location on the digital map closest to the user's currently-selected location, thereby reducing the cognitive burden of the user and creating a more efficient human-machine interface. The method also provides the user with traversal information that is updated based on the current position of the user's drag gesture, thereby also reducing the cognitive burden of the user and creating a more efficient human-machine interface. For battery-operated computing devices, enabling the user to receive traversal information about traveling along a path that takes the user closest to a current location selected by the user faster and more efficiently conserves power and increases the time between battery charges.

In some embodiments, the audio of the traversal information includes a cardinal direction of travel from the starting location and along the path of the plurality of paths (740). FIGS. 6D-6E, for example, illustrate detecting a tap gesture with contact 5506 over a section of Spring Street that is southeast of the intersection of Bourke Street and Spring Street, and in response to detecting the tap gesture, providing audio that taking Spring Street southeast (the cardinal direction of Spring Street) would take the user from the intersection of Bourke Street and Spring Street to a four-way intersection between Spring Street, Macarthur Street, and Collins Street. Providing the user with the cardinal direction of travel helps the user determine the direction of navigation from the starting location, thereby reducing the cognitive burden on the user. For battery-operated computing devices, enabling the user to receive useful information about exploring a geographic region faster and more efficiently conserves power and increases the time between battery charges.

In some embodiments, device 100, in response to detecting the third user input, determines (742) one or more paths that are connected to the starting location and are bisected by the drag gesture. FIGS. 6E-6F, for example, illustrate detecting a drag gesture with contact 5602 from position 5602A over Spring Street heading southwest from the intersection of Bourke Street and Spring Street to position 5602B over an area of the digital map near Bourke Street heading southwest from the intersection of Spring Street and Bourke Street, and in response to detecting the drag gesture. Device 100, in response to detecting the drag gesture illustrated in FIGS. 6E-6F, determines that the drag gesture bisects Bourke Street heading southwest. FIGS. 6F-6G illustrate detecting the drag gesture with contact 5602 from position 5602B to position 5602C over the intersection of Nicholson Street and Spring Street. Device 100, in response to detecting the drag gesture illustrated in FIGS. 6F-6G, determines that the drag gesture bisects Spring Street heading northwest.

In some embodiments, device 100 provides (742) audio that includes street names of each path of the one or more paths in an order that the respective paths are bisected by the drag gesture. Continuing with the foregoing example, device 100, in response to detecting the drag gesture illustrated in FIGS. 6E-6F from position 5602A-5602B, provides audio that includes the street name of Bourke Street, which bisects the drag gesture from position 5602A-5602B. Further, device 100, in response to detecting the drag gesture illustrated in FIGS. 6F-6G from position 5602B-5602C, provides audio that includes the street name of Spring Street, which bisects the drag gesture from position 5602B-5602C. The method allows the user to perform a simple gesture to select locations the user would like to explore, thereby reducing the cognitive burden of the user and creating a more efficient human-machine interface. The method also provides the user with useful information about traveling along each path that bisects the user's gesture, thereby also reducing the cognitive burden of the user. For battery-operated computing devices, enabling the user to receive useful information about exploring a geographic region faster and more efficiently conserves power and increases the time between battery charges.

In some embodiments, device 100, after detecting the second user input, detects (744), via the one or more input devices, a third user input to designate a new location on the map as a new starting location. In some embodiments, device 100, in response to detecting the third user input, designates (744) the new location as the new starting location. FIGS. 6H-6I, for example, illustrate detecting double tap gesture with contact 5508 over the intersection of Nicholson Street and Spring Street, and in response to detecting the tap gesture, designating the intersection of Nicholson Street and Spring Street as the new starting location. The method allows the user to perform a simple input (e.g., double tap gesture on a new location, etc.) to designate a new starting location on the digital map, thereby reducing the cognitive burden of the user and creating a more efficient human-machine interface. The method also allows the user to select a different starting location and to obtain traversal information about traveling from the new starting location, thereby reducing the cognitive burden of the user. For battery-operated computing devices, enabling the user to select different starting locations faster and more efficiently conserves power and increases the time between battery charges.

In some embodiments, device 100, after detecting the third user input, detects (746), via the one or more input devices, a fourth user input to designate a previous starting location as the new starting location. In some embodiments, the fourth user input is a double tap gesture over a previous starting location. In some embodiments, the fourth user input is an audio command to designate a previous starting location as the new starting location. In some embodiments, device 100, in response to detecting the fourth user input, designates (746) the previous starting location as the new starting location. In some embodiments, device 100, in response to detecting a double tap gesture over a previous starting location, designates the previous starting location as the new starting location. In some embodiments, device 100, in response to detecting an audio command to designate a previous starting location as the new starting location, designates the previous starting location as the new starting location. The method allows the user to perform a simple input (e.g., double tap gesture on a previous starting location, etc.) to re-select a previous starting location, thereby reducing the cognitive burden of the user and creating a more efficient human-machine interface. The method also allows the user to select a different starting location and to obtain traversal information about traveling from the new starting location, thereby reducing the cognitive burden of the user. For battery-operated computing devices, enabling the user to select a previous starting location faster and more efficiently conserves power and increases the time between battery charges.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method, comprising:
    at an electronic device in communication with a display and one or more input devices:
        displaying a map of a geographic region via the display;
        detecting, via the one or more input devices, a first user input to select a first position on the map, wherein the first position on the map corresponds to a starting location on the map;
        in response to detecting the first user input to select the first position on the map:
            in accordance with a determination that the first position on the map corresponds to a first type of geographic position, setting the starting location to the first position on the map; and
            in accordance with a determination that the first position on the map corresponds to a second type of geographic position, different from the first type of geographic position, setting the starting location to a second position on the map, different from the first position, wherein the second position on the map is of the first type of geographic position;
        after detecting the first user input, detecting, via the one or more input devices, a second user input to select a first direction of navigation relative to the starting location, wherein the second user input selects the first direction of navigation without selecting an ending location of a path that traverses in the first direction of navigation; and
        in response to detecting the second user input:
            determining the ending location based on the starting location and the first direction of navigation; and
            providing, based on a verbosity setting, audio that includes traversal information about traversing along the path in the geographic region in the first direction of navigation and from the starting location to the ending location, wherein the path connects the starting location to the ending location.

2. The method of claim 1, further comprising in response to detecting the first user input and before detecting the second user input, providing audio that includes a description of the starting location.

3. The method of claim 1, wherein detecting the first user input comprises detecting a double input directed at a location on the map to designate the location as the starting location.

4. The method of claim 1, wherein determining the ending location based on the starting location and the first direction of navigation comprises:
    determining a first intersection along the path from the starting location; and
    designating the first intersection as the ending location.

5. The method of claim 1, wherein in response to detecting the second user input, and in accordance with a determination of at least one point of interest along the path between the starting location and the ending location, providing the audio that includes the traversal information comprises providing audio information about the at least one point of interest.

6. The method of claim 1, wherein in response to detecting the second user input, and in accordance with a determination of a distance from the starting location and the ending location, providing the audio that includes the traversal information comprises providing audio information that includes the distance.

7. The method of claim 1, wherein in response to detecting the second user input, and in accordance with a determination of a distance from the starting location to a second nearest intersection along the path and between the starting location and the ending location, providing the audio that includes the traversal information comprises providing audio information about the distance from the starting location to the second nearest intersection.

8. The method of claim 1, wherein in response to detecting the second user input, and in accordance with a determination of at least one hazard along the path between the starting location and the ending location, providing the audio that includes the traversal information comprises providing audio information about the at least one hazard.

9. The method of claim 1, wherein in response to detecting the second user input, and in accordance with a determination of an elevation change along the path between the starting location and the ending location, providing audio that includes the traversal information comprises providing audio information about the elevation change.

10. The method of claim 1, wherein providing the audio that includes the traversal information comprises providing an audio description of the ending location.

11. The method of claim 1, further comprising:
    detecting, via the one or more input devices, a third user input to select an intersection on the map; and
    in response to detecting the third user input to select the intersection, providing audio of names of one or more thoroughfares that bisect the intersection.

12. The method of claim 1, further comprising:

after detecting the first user input, detecting, via the one or more input devices, a third user input directed at a plurality of locations around the starting location; and in response to detecting the third user input:
　determining one or more paths on the map that connect the starting location to one or more locations of the plurality of locations around the starting location; and
　providing audio that includes traversal information about traversing along the one or more paths from the starting location.

13. The method of claim 12, further comprising:
in response to detecting the third user input, and in accordance with a determination that the third user input is being performed:
　determining a location of the plurality of locations around the starting location at which the third user input is directed, wherein the location is associated with a current position of the third user input;
　determining a plurality of paths that are connected to the starting location; and
　providing audio that includes traversal information about traversing along a first path of the plurality of paths that connects the starting location to a location on the map nearest to the location that is associated with the current position of the third user input.

14. The method of claim 13, wherein providing audio of the traversal information about traversing along the first path of the plurality of paths that connects the starting location to the location on the map nearest to the location that is associated with the current position of the third user input comprises providing audio of a cardinal direction of travel from the starting location and along the first path of the plurality of paths.

15. The method of claim 12, further comprising:
in response to detecting the third user input:
　determining the one or more paths that are connected to the starting location and are bisected by the third user input; and
　providing audio that includes a street name of each path of the one or more paths in an order that the one or more paths are bisected by the third user input.

16. The method of claim 1, further comprising:
after detecting the second user input, detecting, via the one or more input devices, a third user input to designate a new location on the map as a new starting location; and
in response to detecting the third user input, designating the new location as the new starting location.

17. The method of claim 16, further comprising:
after detecting the third user input, detecting, via the one or more input devices, a fourth user input to designate a previous starting location as the new starting location; and
in response to detecting the fourth user input, designating the previous starting location as the new starting location.

18. An electronic device, comprising:
a display;
a speaker;
one or more input devices;
one or more processors;
memory; and
one or more programs, wherein the one or more programs are stored in the memory and configured to be executed by the one or more processors, the one or more programs including instructions for:
　displaying a map of a geographic region via the display;
　detecting, via the one or more input devices, a first user input to select a first position on the map, wherein the first position on the map corresponds to a starting location on the map;
　in response to detecting the first user input to select the first position on the map:
　　in accordance with a determination that the first position on the map corresponds to a first type of geographic position, setting the starting location to the first position on the map; and
　　in accordance with a determination that the first position on the map corresponds to a second type of geographic position, different from the first type of geographic position, setting the starting location to a second position on the map, different from the first position, wherein the second position on the map is of the first type of geographic position;
　after detecting the first user input, detecting, via the one or more input devices, a second user input to select a first direction of navigation relative to the starting location, wherein the second user input selects the first direction of navigation without selecting an ending location of a path that traverses in the first direction of navigation; and
　in response to detecting the second user input:
　　determining the ending location based on the starting location and the first direction of navigation; and
　　providing, based on a verbosity setting, audio that includes traversal information about traversing along the path in the geographic region in the first direction of navigation and from the starting location to the ending location, wherein the path connects the starting location to the ending location.

19. The electronic device of claim 18, the one or more programs further comprising instructions for in response to detecting the first user input and before detecting the second user input, providing audio that includes a description of the starting location.

20. The electronic device of claim 18, wherein detecting the first user input comprises detecting a double input directed at a location on the map to designate the location as the starting location.

21. The electronic device of claim 18, wherein determining the ending location based on the starting location and the first direction of navigation comprises:
　determining a first intersection along the path from the starting location; and
　designating the first intersection as the ending location.

22. The electronic device of claim 18, wherein in response to detecting the second user input, and in accordance with a determination of at least one point of interest along the path between the starting location and the ending location, providing the audio that includes the traversal information comprises providing audio information about the at least one point of interest.

23. The electronic device of claim 18, wherein in response to detecting the second user input, and in accordance with a determination of a distance from the starting location and the ending location, providing the audio that includes the traversal information comprises providing audio information that includes the distance.

24. The electronic device of claim 18, wherein in response to detecting the second user input, and in accordance with a determination of a distance from the starting location to a second nearest intersection along the path and between the starting location and the ending location, providing the audio that includes the traversal information comprises providing audio information about the distance from the starting location to the second nearest intersection.

25. The electronic device of claim 18, wherein in response to detecting the second user input, and in accordance with a determination of at least one hazard along the path between the starting location and the ending location, providing the audio that includes the traversal information comprises providing audio information about the at least one hazard.

26. The electronic device of claim 18, wherein in response to detecting the second user input, and in accordance with a determination of an elevation change along the path between the starting location and the ending location, providing audio that includes the traversal information comprises providing audio information about the elevation change.

27. The electronic device of claim 18, wherein providing the audio that includes the traversal information comprises providing an audio description of the ending location.

28. The electronic device of claim 18, the one or more programs further comprising instructions for:
   detecting, via the one or more input devices, a third user input to select an intersection on the map; and
   in response to detecting the third user input to select the intersection, providing audio of names of one or more thoroughfares that bisect the intersection.

29. The electronic device of claim 18, the one or more programs further comprising instructions for:
   after detecting the first user input, detecting, via the one or more input devices, a third user input directed at a plurality of locations around the starting location; and
   in response to detecting the third user input:
      determining one or more paths on the map that connect the starting location to one or more locations of the plurality of locations around the starting location; and
      providing audio that includes traversal information about traversing along the one or more paths from the starting location.

30. The electronic device of claim 29, the one or more programs further comprising instructions for:
   in response to detecting the third user input, and in accordance with a determination that the third user input is being performed:
      determining a location of the plurality of locations around the starting location at which the third user input is directed, wherein the location is associated with a current position of the third user input;
      determining a plurality of paths that are connected to the starting location; and
      providing audio that includes traversal information about traversing along a first path of the plurality of paths that connects the starting location to a location on the map nearest to the location that is associated with the current position of the third user input.

31. The electronic device of claim 30, wherein providing audio of the traversal information about traversing along the first path of the plurality of paths that connects the starting location to the location on the map nearest to the location that is associated with the current position of the third user input comprises providing audio of a cardinal direction of travel from the starting location and along the first path of the plurality of paths.

32. The electronic device of claim 29, the one or more programs further comprising instructions for:
   in response to detecting the third user input:
      determining the one or more paths that are connected to the starting location and are bisected by the third user input; and
      providing audio that includes a street name of each path of the one or more paths in an order that the one or more paths are bisected by the third user input.

33. The electronic device of claim 18, the one or more programs further comprising instructions for:
   after detecting the second user input, detecting, via the one or more input devices, a third user input to designate a new location on the map as a new starting location; and
   in response to detecting the third user input, designating the new location as the new starting location.

34. The electronic device of claim 33, the one or more programs further comprising instructions for:
   after detecting the third user input, detecting, via the one or more input devices, a fourth user input to designate a previous starting location as the new starting location; and
   in response to detecting the fourth user input, designating the previous starting location as the new starting location.

35. A non-transitory computer readable storage medium storing one or more programs, the one or more programs comprising instructions which, when executed by one or more processors of an electronic device with a display and one or more input devices, cause the electronic device to perform a method comprising:
   displaying a map of a geographic region via the display;
   detecting, via the one or more input devices, a first user input to select a first position on the map, wherein the first position on the map corresponds to a starting location on the map;
   in response to detecting the first user input to select the first position on the map:
      in accordance with a determination that the first position on the map corresponds to a first type of geographic position, setting the starting location to the first position on the map; and
      in accordance with a determination that the first position on the map corresponds to a second type of geographic position, different from the first type of geographic position, setting the starting location to a second position on the map, different from the first position, wherein the second position on the map is of the first type of geographic position;
   after detecting the first user input, detecting, via the one or more input devices, a second user input to select a first direction of navigation relative to the starting location, wherein the second user input selects the first direction of navigation without selecting an ending location of a path that traverses in the first direction of navigation; and
   in response to detecting the second user input:
      determining the ending location based on the starting location and the first direction of navigation; and
      providing, based on a verbosity setting, audio that includes traversal information about traversing along the path in the geographic region in the first direction of navigation and from the starting location to the ending location, wherein the path connects the starting location to the ending location.

36. The non-transitory computer readable storage medium of claim 35, the method further comprising in response to detecting the first user input and before detecting the second user input, providing audio that includes a description of the starting location.

37. The non-transitory computer readable storage medium of claim 35, wherein detecting the first user input comprises detecting a double input directed at a location on the map to designate the location as the starting location.

38. The non-transitory computer readable storage medium of claim 35, wherein determining the ending location based on the starting location and the first direction of navigation comprises:
   determining a first intersection along the path from the starting location; and
   designating the first intersection as the ending location.

39. The non-transitory computer readable storage medium of claim 35, wherein in response to detecting the second user input, and in accordance with a determination of at least one point of interest along the path between the starting location and the ending location, providing the audio that includes the traversal information comprises providing audio information about the at least one point of interest.

40. The non-transitory computer readable storage medium of claim 35, wherein in response to detecting the second user input, and in accordance with a determination of a distance from the starting location and the ending location, providing the audio that includes the traversal information comprises providing audio information that includes the distance.

41. The non-transitory computer readable storage medium of claim 35, wherein in response to detecting the second user input, and in accordance with a determination of a distance from the starting location to a second nearest intersection along the path and between the starting location and the ending location, providing the audio that includes the traversal information comprises providing audio information about the distance from the starting location to the second nearest intersection.

42. The non-transitory computer readable storage medium of claim 35, wherein in response to detecting the second user input, and in accordance with a determination of at least one hazard along the path between the starting location and the ending location, providing the audio that includes the traversal information comprises providing audio information about the at least one hazard.

43. The non-transitory computer readable storage medium of claim 35, wherein in response to detecting the second user input, and in accordance with a determination of an elevation change along the path between the starting location and the ending location, providing audio that includes the traversal information comprises providing audio information about the elevation change.

44. The non-transitory computer readable storage medium of claim 35, wherein providing the audio that includes the traversal information comprises providing an audio description of the ending location.

45. The non-transitory computer readable storage medium of claim 35, the method further comprising:
   detecting, via the one or more input devices, a third user input to select an intersection on the map; and
   in response to detecting the third user input to select the intersection, providing audio of names of one or more thoroughfares that bisect the intersection.

46. The non-transitory computer readable storage medium of claim 35, the method further comprising:
   after detecting the first user input, detecting, via the one or more input devices, a third user input directed at a plurality of locations around the starting location; and
   in response to detecting the third user input:
      determining one or more paths on the map that connect the starting location to one or more locations of the plurality of locations around the starting location; and
      providing audio that includes traversal information about traversing along the one or more paths from the starting location.

47. The non-transitory computer readable storage medium of claim 46, the method further comprising:
   in response to detecting the third user input, and in accordance with a determination that the third user input is being performed:
      determining a location of the plurality of locations around the starting location at which the third user input is directed, wherein the location is associated with a current position of the third user input;
      determining a plurality of paths that are connected to the starting location; and
      providing audio that includes traversal information about traversing along a first path of the plurality of paths that connects the starting location to a location on the map nearest to the location that is associated with the current position of the third user input.

48. The non-transitory computer readable storage medium of claim 47, wherein providing audio of the traversal information about traversing along the first path of the plurality of paths that connects the starting location to the location on the map nearest to the location that is associated with the current position of the third user input comprises providing audio of a cardinal direction of travel from the starting location and along the first path of the plurality of paths.

49. The non-transitory computer readable storage medium of claim 46, the method further comprising:
   in response to detecting the third user input:
      determining the one or more paths that are connected to the starting location and are bisected by the third user input; and
      providing audio that includes a street name of each path of the one or more paths in an order that the one or more paths are bisected by the third user input.

50. The non-transitory computer readable storage medium of claim 35, the method further comprising:
   after detecting the second user input, detecting, via the one or more input devices, a third user input to designate a new location on the map as a new starting location; and
   in response to detecting the third user input, designating the new location as the new starting location.

51. The non-transitory computer readable storage medium of claim 50, the method further comprising:
   after detecting the third user input, detecting, via the one or more input devices, a fourth user input to designate a previous starting location as the new starting location; and
   in response to detecting the fourth user input, designating the previous starting location as the new starting location.

* * * * *